(12) United States Patent
Jain et al.

(10) Patent No.: US 9,300,442 B2
(45) Date of Patent: Mar. 29, 2016

(54) ALLOWING A REJECTED WIRELESS COMMUNICATION DEVICE ACCESS TO A COMMUNICATION CHANNEL

(75) Inventors: Vikrant Jain, Farnborough (GB); Mungal Singh Dhanda, Slough (GB); Philip J. Children, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 13/553,576

(22) Filed: Jul. 19, 2012

(65) Prior Publication Data

US 2013/0021971 A1 Jan. 24, 2013

Related U.S. Application Data

(60) Provisional application No. 61/510,278, filed on Jul. 21, 2011.

(51) Int. Cl.
H04L 1/18 (2006.01)
H04W 76/02 (2009.01)

(52) U.S. Cl.
CPC ............. H04L 1/1887 (2013.01); H04W 76/02 (2013.01)

(58) Field of Classification Search
None
See application file for complete search history.

(56) References Cited

U.S. PATENT DOCUMENTS

| | | | |
|---|---|---|---|
| 5,752,193 A * | 5/1998 | Scholefield et al. | 455/452.2 |
| 6,718,179 B1 | 4/2004 | Forssell et al. | |
| 6,845,235 B1 * | 1/2005 | Barve | 455/412.1 |
| 7,917,183 B2 | 3/2011 | Ryu et al. | |
| 7,948,991 B1 | 5/2011 | Hart et al. | |
| 2002/0105940 A1 | 8/2002 | Forssell et al. | |
| 2003/0125051 A1 | 7/2003 | Leppisaari | |
| 2003/0227934 A1 | 12/2003 | White et al. | |
| 2004/0090948 A1 | 5/2004 | Forssell et al. | |
| 2006/0099940 A1 | 5/2006 | Pfleging et al. | |
| 2007/0189207 A1 | 8/2007 | Sammour et al. | |
| 2007/0249343 A1 | 10/2007 | Olsson et al. | |
| 2007/0268870 A1 | 11/2007 | Buckley et al. | |
| 2009/0252100 A1 | 10/2009 | Sridhara et al. | |
| 2010/0036921 A1 * | 2/2010 | Ananthanarayanan et al. | 709/206 |
| 2010/0061350 A1 | 3/2010 | Flammer, III | |
| 2010/0069091 A1 | 3/2010 | El-Saidny | |

(Continued)

FOREIGN PATENT DOCUMENTS

| | | | |
|---|---|---|---|
| EP | 0725339 A2 | 8/1996 | |
| EP | 2227065 A1 | 9/2010 | |

(Continued)

OTHER PUBLICATIONS

International Search Report and Written Opinion—PCT/US2012/047619—ISA/EPO—Sep. 4, 2012.

(Continued)

Primary Examiner — Ian N Moore
Assistant Examiner — Latresa McCallum
(74) Attorney, Agent, or Firm — Larry J. Moskowitz

(57) ABSTRACT

Devices, systems, articles of manufacture, and methods for allowing a rejected wireless communication device access to a communication channel are described. According to some embodiments, a message that includes a wait state override indicator is generated. The message is transmitted to the wireless communication device. A communication channel is established with the wireless communication device based on the wait state override indicator. Other aspects, embodiments, and features are also claimed and described.

48 Claims, 17 Drawing Sheets

(56) References Cited

U.S. PATENT DOCUMENTS

| | | |
|---|---|---|
| 2010/0173651 A1 | 7/2010 | Park et al. |
| 2010/0238910 A1 | 9/2010 | Conway et al. |
| 2010/0260114 A1 | 10/2010 | Vermani et al. |
| 2010/0261469 A1* | 10/2010 | Ribeiro ............... H04W 99/00 455/423 |
| 2011/0090855 A1 | 4/2011 | Kim |
| 2011/0096710 A1 | 4/2011 | Liu et al. |
| 2011/0158159 A1 | 6/2011 | Gong et al. |
| 2011/0201343 A1 | 8/2011 | Pinheiro et al. |
| 2011/0261742 A1 | 10/2011 | Wentink |
| 2011/0270984 A1 | 11/2011 | Park |
| 2012/0057486 A1 | 3/2012 | Abedi et al. |
| 2012/0195250 A1 | 8/2012 | Jain et al. |
| 2012/0254890 A1* | 10/2012 | Li ........................ H04W 4/005 719/313 |
| 2012/0315874 A1* | 12/2012 | Li ........................ H04L 65/102 455/411 |

FOREIGN PATENT DOCUMENTS

| | | |
|---|---|---|
| EP | 2437428 A1 | 4/2012 |
| JP | 2000069555 A | 3/2000 |
| JP | 2002320275 A | 10/2002 |
| JP | 2004511984 A | 4/2004 |
| JP | 2010503250 A | 1/2010 |
| JP | 2012502551 A | 1/2012 |
| WO | WO-0232168 A1 | 4/2002 |
| WO | WO-2008029210 A2 | 3/2008 |
| WO | WO-2009012448 A2 | 1/2009 |
| WO | WO-2009157901 A1 | 12/2009 |
| WO | WO-2010030322 A2 | 3/2010 |
| WO | WO-2011149318 A2 | 12/2011 |

OTHER PUBLICATIONS

"3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 10)", 3GPP Standard; 3GPP TS 44.060, 3rd Generation Partnership Project (3GPP), Mobile Competence Centre ; 650, Route Des Lucioles ; F-06921 Sophia-Antipolis Cedex; France, No. V10.3.0, Dec. 20, 2010, pp. 1-623, XP050462334, [retrieved on Dec. 20, 2010].

* cited by examiner

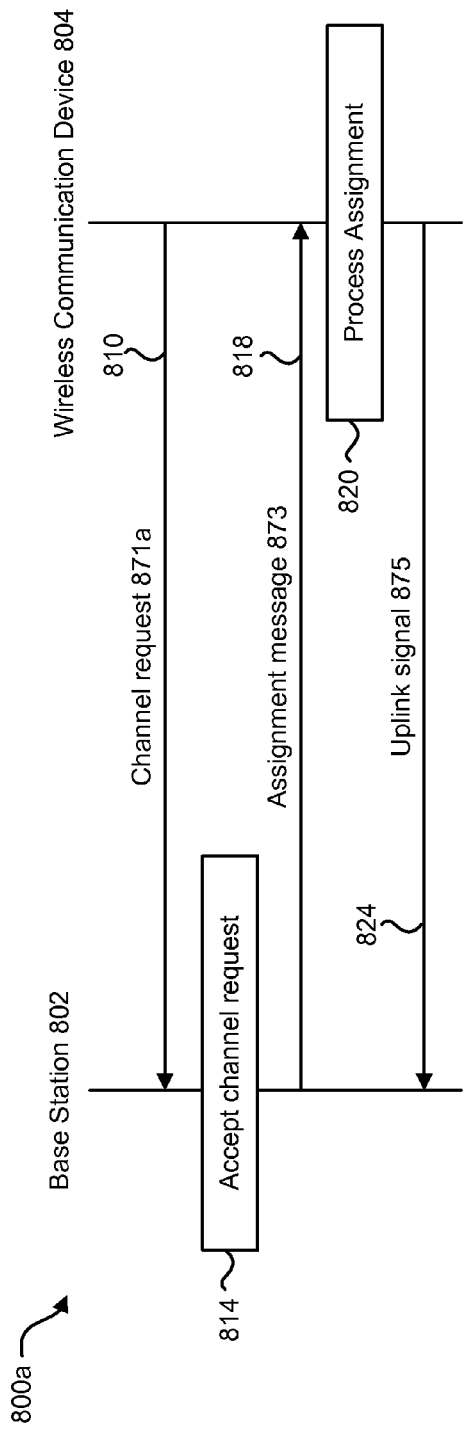
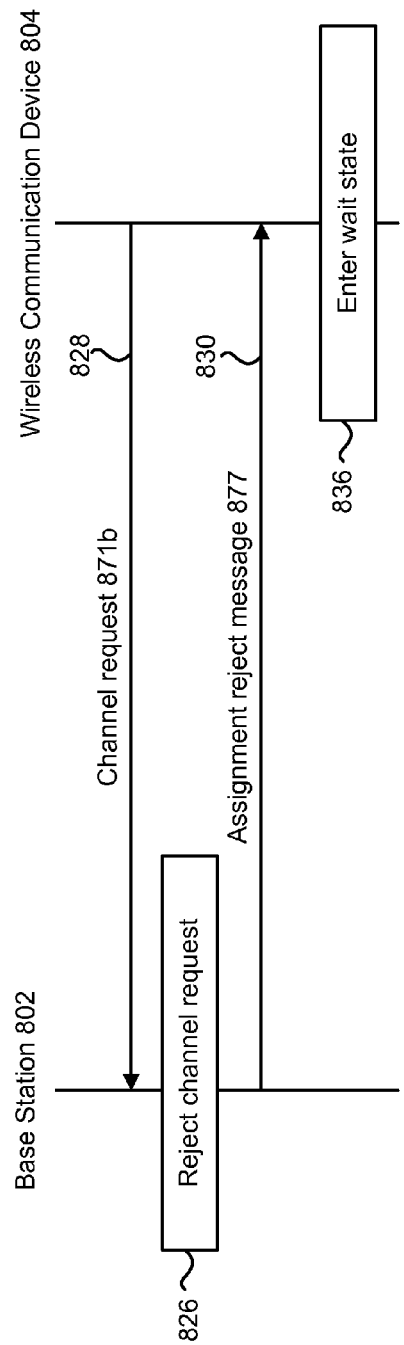
FIG. 8A
FIG. 8B

ALLOWING A REJECTED WIRELESS COMMUNICATION DEVICE ACCESS TO A COMMUNICATION CHANNEL

RELATED APPLICATIONS AND PRIORITY CLAIM

This application is related to and claims priority from U.S. Provisional Patent Application Ser. No. 61/510,278, filed Jul. 21, 2011, for "WIRELESS TERMINAL WAIT STATE OVERRIDE," which is incorporated herein by reference as if fully set forth below and for all purposes.

TECHNICAL FIELD

Embodiments discussed in the present disclosure relate generally to communication systems. More specifically, embodiments discussed in the present disclosure relate to allowing a rejected wireless communication device access to a communication channel.

BACKGROUND

Wireless communication systems have become an important means by which many people worldwide have come to communicate. A wireless communication system may provide communication for a number of subscriber stations, each of which may be serviced by a base station.

Wireless communication systems typically include a network and multiple wireless communication devices. Wireless communication devices require access to communication channels to communicate with the network. As the number of wireless communication devices increases, however, the available network resources may decrease. For example, certain devices may not be able to communicate with a network for long periods of time. Embodiments of the present invention are provisioned to addressing such issues as well as others.

SUMMARY OF SOME EXAMPLE EMBODIMENTS

Devices, systems, articles of manufacture and methods for restricting access to a communication channel are described. Benefits may be realized by allowing a rejected wireless communication device access to a communication channel. According to one embodiment, a method for establishing a communication channel with a wireless communication device is described. A message, including a wait state override indicator, is generated. The message is transmitted to the wireless communication device. A communication channel is established with the wireless communication device based on the wait state override indicator.

A channel request from the wireless communication device may be received. The channel request may have been made in response to the message. The channel request may be received via an access channel.

The wireless communication device may be in a wait state when the message is transmitted to the wireless communication device. Channel requests may not be able to be transmitted unless the wait state is overridden. The message may be transmitted prior to the expiration of the wait state of the wireless communication device. The message may be transmitted after the expiration of the wait state of the wireless communication device.

The message may include a paging message. The message may be generated in response to reception of an urgent information message that includes the wait state override indicator. The urgent information message may be received from outside a wireless communication network.

The wireless communication device may operate autonomously to initiate establishment of a communication channel. The method may be performed by a base station. The wireless communication device may be a machine type communication device. The wait state override indicator in the message may be transmitted to more than one wireless communication device.

According to another embodiment, an apparatus for establishing a communication channel with a wireless communication device is described. The apparatus includes a processor and executable instructions stored in memory that is in electronic communication with the processor. The apparatus generates a message that includes a wait state override indicator. The apparatus also transmits the message to the wireless communication device. The apparatus further establishes a communication channel with the wireless communication device based on the wait state override indicator.

According to still another embodiment, a method for establishing a communication channel by a wireless communication device is described. A message is received from a wireless communication system. A determination is made from the message that a wait state is to be overridden. Establishing a communication channel with the wireless communication system, based on the message, is attempted.

Attempting to establish a communication channel may include transmitting a channel request on an access channel in response to the message. The apparatus may also wait in the wait state. Channel requests may not be able to be transmitted unless the wait state is overridden.

The message may include a paging message. The message may include a wait state override flag. Determining that a wait state is to be overridden may include determining that the value of the wait state override flag indicates that the wait state is to be overridden.

The apparatus may also return to the wait state after completion of information exchange related to wait state override. The wireless communication device may operate autonomously to initiate establishment of a communication channel. The wireless communication device may be a machine type communication device. The wireless communication system may be a radio access network. The radio access network may include a gateway, a base station subsystem, a system control, a mobile switching station, and/or a serving general packet radio service support node.

According to another embodiment, an apparatus for establishing a communication channel by a wireless communication device is described. The apparatus includes a processor and executable instructions stored in memory that is in electronic communication with the processor. The apparatus receives a message from a wireless communication system. The apparatus also determines from the message that a wait state is to be overridden. The apparatus further attempts to establish a communication channel with the wireless communication system based on the message.

According to yet another embodiment, a computer-program product for establishing a communication channel with a wireless communication device is described. The computer-program product includes a non-transitory computer-readable medium with instructions thereon. The computer-program product includes instructions for generating a message that comprises a wait state override indicator. The computer-program product also includes instructions for transmitting the message to the wireless communication device. The computer-program product further includes instructions for establish a communication channel with the wireless communication device based on the wait state override indicator.

According to still another embodiment, a computer-program product for establishing a communication channel by a wireless communication device is described. The computer-program product includes a non-transitory computer-readable medium having instructions thereon. The computer-program product includes instructions for receiving a message from a wireless communication system. The computer-program product also includes instructions for determining from the message that a wait state is to be overridden. The computer-program product further includes instructions for attempting to establish a communication channel with the wireless communication system based on the message.

According to still yet another embodiment, a wireless communication device is described. The wireless communication device includes a processor. The wireless communication device enters the wireless communication device in a wait state. The wireless communication device monitors for receiving an override flag. Upon receiving the override flag, the wireless communication device enters the wireless communication device in a communication state by attempting to communicate with another wireless device. The wireless communication device further enables the wireless communication device to enter a communicate state with the other wireless device. Upon completion of the communicate state addition, the wireless communication device re-enters the wireless communication device in a wait state.

According to yet another embodiment, an apparatus for establishing a communication channel with a wireless communication device is described. The apparatus includes means for generating a message that comprises a wait state override indicator. The apparatus also includes means for transmitting the message to the wireless communication device. The apparatus further includes means for establishing a communication channel with the wireless communication device based on the wait state override indicator.

According to still yet another embodiment, an apparatus configured for establishing a communication channel by a wireless communication device is described. The apparatus includes means for receiving a message from a wireless communication system. The apparatus also includes means for determining from the message that a wait state is to be overridden. The apparatus further includes means for attempting to establish a communication channel with the wireless communication system based on the message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

FIGS. 8A and 8B illustrate call flow diagrams for assigning a channel to a wireless communication device in which embodiments of the present invention disclosed herein may be utilized;

DETAILED DESCRIPTION OF ALTERNATIVE & EXEMPLARY EMBODIMENTS

More and more people are using wireless communication devices, such as, for example, mobile phones, not only for voice but also for data communications. Telecommunications networks are being placed under increasing strain, both due to increasing bandwidth requirements of smartphones and mobile computers, and the increasing numbers devices and programs that seek access to the networks.

For example, many applications running on smartphones periodically access the network to check for updates. While each access itself only consumes a relatively small amount of bandwidth, a large number of devices running lots of these applications can place a significant load on networks, and signaling and control channels in particular. The increasing prevalence of machine type communication (MTC) devices (e.g., machine-to-machine (M2M)) can similarly increase demands placed upon network resources.

Figure 1:
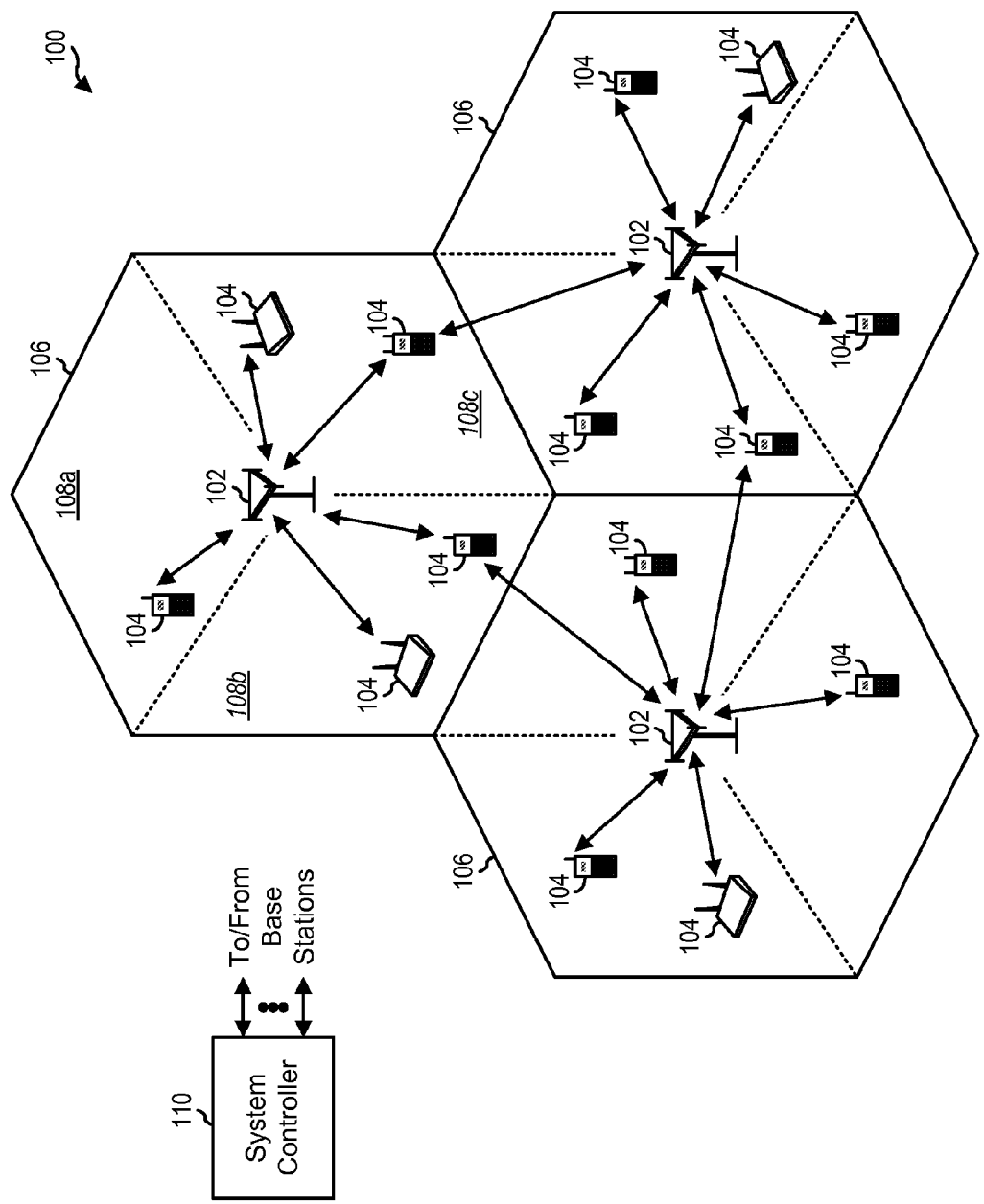
FIG. 1 illustrates an example of a wireless communication system in which embodiments of the present invention disclosed herein may be utilized.

FIG. 1 illustrates an example of a wireless communication system 100 in which the systems and methods disclosed herein may be utilized. The wireless communication system 100 includes multiple base stations (BS) 102 and multiple wireless communication devices 104. Each base station 102 provides communication coverage for a particular geographic area 106. The term "cell" can refer to a base station 102 and/or its coverage area 106 depending on the context in which the term is used.

As used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers, personal computers, machine type communication (MTC) devices, machine-to-machine (M2M) devices, and sensor devices (including, for example, so-called "smart-meters," alarms, and health monitoring devices). A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE), an MTC device, or an M2M device, or some other similar terminology. Although MTC device is used below to illustrate the gains that may be achieved in MTC devices, gains may also be achieved for other wireless communication devices 104 as well The term "base station" refers to a wireless communication station that is installed at a location and used to communicate with wireless communication devices 104. In some instances, the location where the base station is installed may not be fixed, such as a base station deployed in a disaster zone. A base station 102 may alternatively be referred to as an access point (including nano-, pico-, and femto-cells), a Node B, an evolved Node B, a Home Node B, or some other similar terminology.

To improve system capacity, a base station coverage area 106 may be partitioned into plural smaller areas, e.g., three smaller areas 108a, 108b, and 108c. Each smaller area 108a, 108b, 108c may be served by a respective base transceiver station (BTS). The term "sector" can refer to a BTS and/or its coverage area 106 depending on the context in which the term is used. For a sectorized cell, the BTSs for all sectors of that cell are typically co-located within the base station 102 for the cell.

Wireless communication devices 104 are typically dispersed throughout the wireless communication system 100. A wireless communication device 104 may communicate with one or more base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102. Uplink and downlink may refer to the communication link or to the carriers used for the communication link.

The wireless communication system 100 may be implemented in varying types of architecture. For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

Multiple wireless communication devices 104 may connect to a wireless communication system 100 (e.g., network). A wireless communication device 104 desiring to connect to the wireless communication system 100 generally does so by transmitting a channel request. The channel request may be transmitted on an uplink (from the wireless communication device 104 to a network apparatus, e.g., a base station 102) via an access channel for requesting access to a channel. The wireless communication device 104 may continue sending channel requests periodically until either it has transmitted a specified number of requests or it receives a response from the wireless communication system 100.

A typical wireless communication system 100 may receive, during a given time period, many more channel requests than it can transmit messages to grant or refuse access. This is partly because each base station coverage area (e.g., cell) 106 has many wireless communication devices 104 and only one base station 102 which can transmit a limited number of messages in a given time period.

The wireless communication system 100 may respond to the channel request by transmitting on the downlink (from the wireless communication system 100 apparatus to the wireless communication device 104) an access message. Access messages can include either an assignment message or a reject message (sometimes also called an assignment reject message).

The wireless communication system 100 transmits the access message via an access channel for granting or refusing access to a channel by a wireless communication device 104. An assignment message indicates that the wireless communication device 104 that requested access has been assigned a channel (i.e., the wireless communication device 104 has been granted access to the channel). An assignment reject message indicates that the wireless communication device 104 that requested access has not been assigned a channel. The assignment reject message can be transmitted when the wireless communication system 100 does not have enough resource to allocate the requested channel, for example, when all suitable channels are in use. A wireless communication device 104 that receives an assignment reject message will generally discontinue sending access requests.

If the wireless communication device 104 receives an assignment reject message, it may enter a wait state for a wait state period. The wait state period may be fixed in accordance with, for example, a telecommunications standard. Alternatively, it can be set by broadcast information (e.g, wireless communication system 100 broadcast information), or the assignment reject message can include the wait state period specifying the duration of the wait state. While the wireless communication device 104 is in the wait state, the wireless communication device 104 will not request resources (e.g., will not send access request) from the wireless communication system 100.

While the intention of the wait state is to prevent wireless communication devices 104 from flooding the network with attempts to establish communication channels, in prior systems, the use of a wait state has effectively prevented the network itself from establishing a communication channel with the wireless communication device 104. The net effect is that the wait state applied to prevent the wireless communication device 104 from attempting to establish a communication channel with the wireless communication system 100 also prevents the wireless communication system 100 from initiating a communication channel with the wireless communication device 104.

After the wait state period has elapsed, the wireless communication device 104 is free to again transmit one or more channel requests to request wireless communication system 100 resources. Again, the wireless communication system 100 can reply with an access message (e.g., assignment message or an assignment reject message). Alternatively the wireless communication system 100 may not reply at all, if network resourcing does not allow it. For example the wireless communication system 100 may not have enough radio resources, or the request from the wireless communication device 104 or the response from the wireless communication device 104 may not get through.

When accessing the wireless communication system 100, the wireless communication device may utilize a counter. For example, each time the wireless communication device 104 transmits a channel request, a counter in the wireless communication device 104 may be modified in some fashion (e.g., incremented or decremented by one). If the wireless communication device 104 does not receive a response to the channel request within a specified period following the transmission of the channel request, the wireless communication device 104 transmits another channel request provided that the counter has not reached a maximum value. The maximum value for the counter can be defined by the wireless communication system 100 via broadcast information. A maximum value can also be determined in other manners. Yet still in some embodiments, a minimum value or some other threshold feature may be utilized for monitoring channel requests.

When the wireless communication device 104 has received an assignment reject message and has entered the wait state, at the end of the wait state period, the counter is reset to zero. The wireless communication device 104 then behaves as though it has not made any channel requests and can again transmit one or more channel requests.

When the counter reaches the maximum value, i.e. when the wireless communication device 104 has transmitted a maximum number of channel requests and has not received an assignment message or an assignment reject message, the wireless communication device 104 will determine that an access failure has occurred and will trigger cell reselection.

Cell reselection is typically performed when a wireless communication device 104 moves between cells, or when the quality of data sent between the active base station and the wireless communication device 104 reduces below a threshold, or when a wireless communication device 104 is denied a network resource that it requests, for example due to traffic congestion in the cell to which it is registered. Cell reselection may occur because a wireless communication system 100 is designed so that a wireless communication device 104 is registered to a single selected base station 102 (the wireless communication device's 104 active or serving base station) at any one time. In cell reselection, the newly-assigned base station becomes the wireless communication device's 104 active base station 102.

The cell reselection process is based on wireless communication devices 104 being mobile and being able to enter and exit cells. However, some class of mobile devices may not actually be mobile, hence cell reselection may not happen. In other words, some wireless communication devices 104, such as some MTC devices, may not be mobile and thus, may not utilize cell reselection. In this case, the non-mobile device (e.g., some MTC devices) may remain in a wait state without any communication from the wireless communication system for many minutes, hours, or days.

Previously, the maximum time period of a wait state was up to 256 seconds. However, with the introduction of MTC devices, this reject period may be multiples of hours or days. Current approaches do not allow the wireless communication device 104 to make an access until the reject time has expired or the device reselects to another cell.

A limitation of one current approach is that if the wireless communication system 100 needs to urgently communicate with a wireless communication device 104, such as an MTC device, it will not be able to do this because the wireless communication device 104 is not communicating with the wireless communication system 100 and has been instructed to not make access. As further explained below, not being able to communicate may cause unintended circumstances.

For example, if a utility company wants to download new charging information onto an MTC device (e.g., smart meter) in a wait state, then the utility company may not be able to do this while the wait state is active. If the wait state lasts for a period of days, then a consumer may not be able to get accurate information from their smart meter for days. Another unintended circumstance is that a consumer's smart meter may not function correctly thereby causing monitoring or other errors.

In another example, if the wireless communication device 104 is an MTC device in the form of a health monitor, the processing of data previously sent by the health monitor to the wireless communication system 100 may result in the need for urgent information in the form of health advice to be relayed to the health monitor for action by the user. If, due to being in a wait state, the wireless communication device 104 is forbidden from responding to a request from the base station 102 to establish a communication channel, the health advice will not be transmitted to wireless communication device 104 until expiry of the wait state.

In urgent situations, and for longer wait states, this can be a critical issue. For instance, emergency services may wish to contact an eHealth MTC device in the case of a low reading showing deteriorating health conditions, etc. Under legacy system with long wait period this may not be possible until wait period is expired.

The decision to override the wireless communication device's 104 wait state may be made within the wireless communication system 100 for any number of reasons. In one configuration, the wait state override may be used in response to an urgent or high-priority message being received by the base station for transmission to the wireless communication device 104. In some configurations (e.g., through a paging indication), a wireless communication device 104 can be explicitly allowed to access to the wireless communication system 100 to respond to the page.

The wait state may prevent the base station 102 from establishing a communication channel with the wireless communication device 104, which is undesirable in a number of situations. If the wait state is of the order of many minutes, or even hours or days as predicted will be commonplace for MTC devices, the inability of the base station 102 to initiate a communication channel with the wireless communication device 104 could be quite inconvenient, or even dangerous.

A further effect of this suppression may be that the wireless communication device 104 is unable to respond to paging messages sent over the paging channel by the base station 102. This is the case even though the wireless communication device 104 monitors the paging channel. As such, the wireless communication system 100, via the base station 102, is powerless to initiate establishment of a communication channel in relation to downlink communications, due to the suppression of uplink communications required to establish such a communication channel. This is undesirable and could in some cases be dangerous in an emergency situation, as previously described. Further detail regarding channel requests are described below.

Therefore, according to embodiments of the present invention, if a rejected wireless communication device 104 is paged by the wireless communication system 100, then it can be signaled to ignore the fact that it has been instructed not to access the wireless communication system 100 for a certain period of time. In other words, the wireless communication device 104 may override the wait state. The wireless communication device 104 may access the wireless communication system 100 to establish a communication channel.

Figure 2:
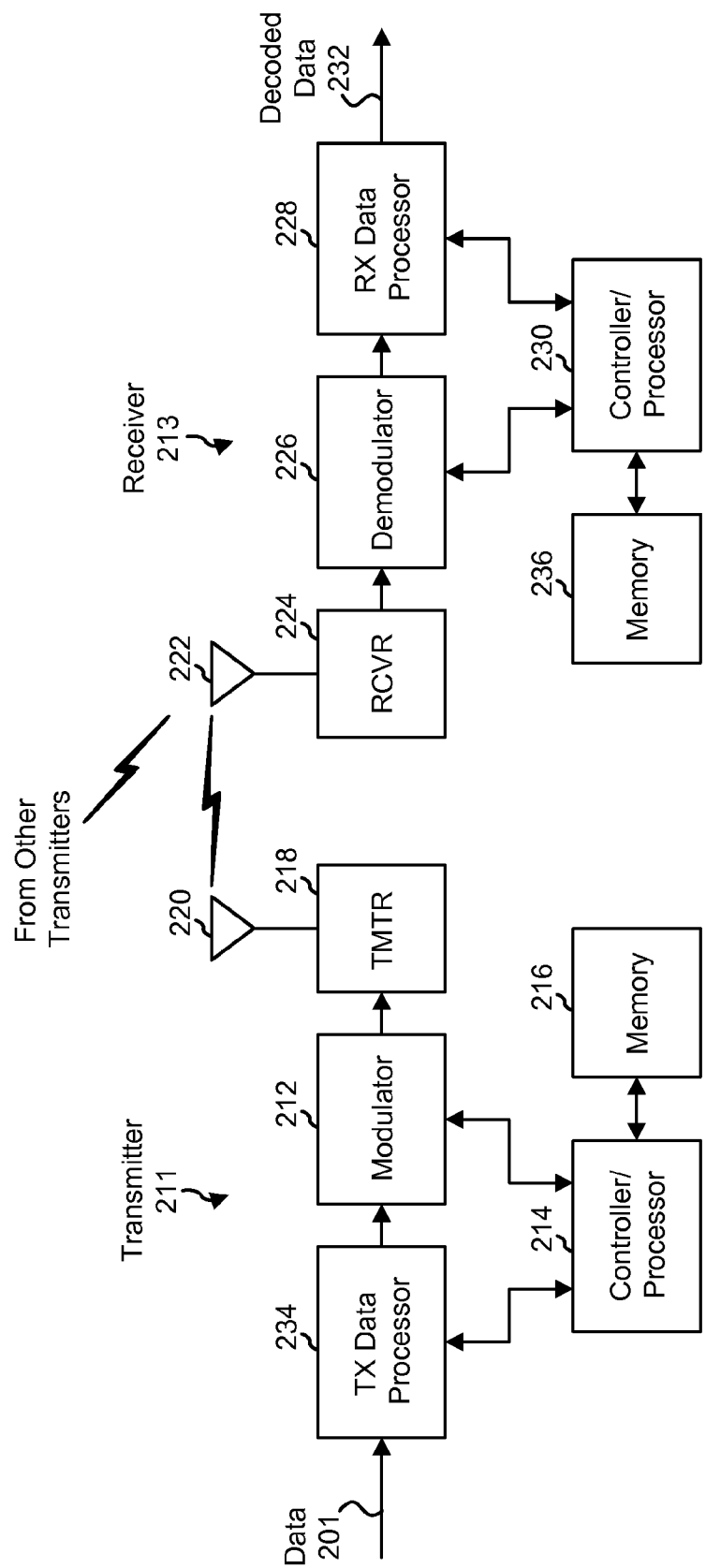
FIG. 2 illustrates a block diagram of a transmitter and a receiver in a wireless communication system according to some embodiments of the present invention.

FIG. 2 illustrates a block diagram of a transmitter 211 and a receiver 213 in a wireless communication system 100 according to some embodiments of the present invention. For the downlink, the transmitter 211 may be part of a base station 102 and the receiver 213 may be part of a wireless communication device 104. For the uplink, the transmitter 211 may be part of a wireless communication device 104 and the receiver 213 may be part of a base station 102.

At the transmitter 211, a transmit (TX) data processor 234 receives and processes (e.g., formats, encodes, and interleaves) data 201 and provides coded data. A modulator 212 performs modulation on the coded data and provides a modulated signal. The modulator 212 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 218 conditions (e.g., filters, amplifies, and upconverts) the modulated signal and generates a radio frequency (RF) modulated signal, which is transmitted via an antenna 220.

At the receiver 213, an antenna 222 receives RF-modulated signals from the transmitter 211 and other transmitters. The antenna 222 provides a received RF signal to a receiver unit (RCVR) 224. The receiver unit 224 conditions (e.g., filters, amplifies and downconverts) the received RF signal, digitizes the conditioned signal, and provides samples. A demodulator 226 processes the samples as described below and provides demodulated data. A receive (RX) data processor 228 processes (e.g., deinterleaves and decodes) the demodulated data and provides decoded data 232. In general, the processing by demodulator 226 and RX data processor 228 is complementary to the processing by the modulator 212 and the TX data processor 234, respectively, at the transmitter 211.

Controllers/processors 214 and 230 direct operation at the transmitter 211 and receiver 213, respectively. Memories 216 and 236 store program codes in the form of computer software and data used by the transmitter 211 and receiver 213, respectively.

Figure 3:
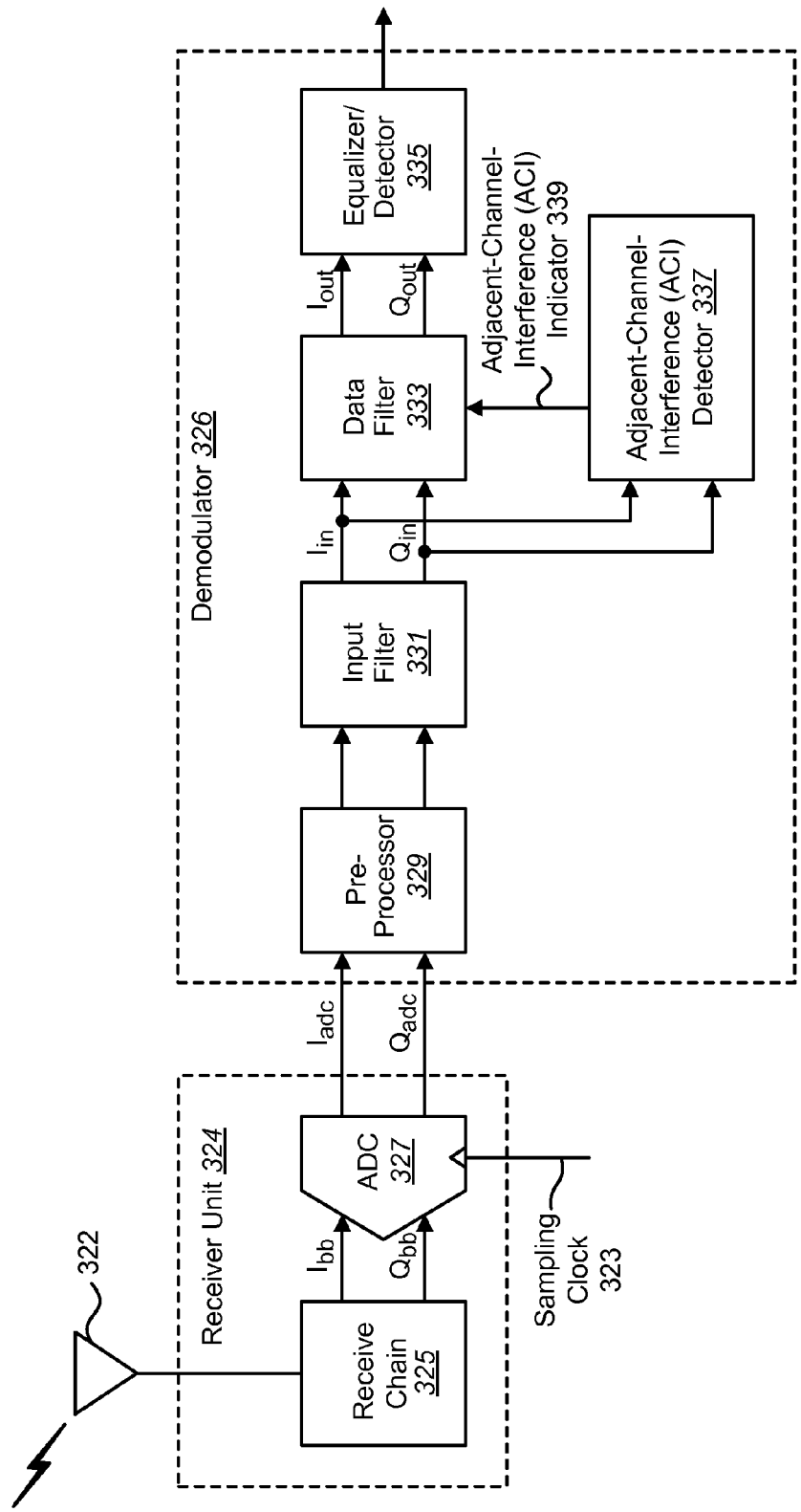
FIG. 3 illustrates a block diagram of a design of a receiver unit and demodulator at a receiver according to some embodiments of the present invention.

FIG. 3 illustrates a block diagram of a design of an antenna 322, a receiver unit 324, and a demodulator 326 at a receiver 213 according to some embodiments of the present invention. Within the receiver unit 324, a receive chain 325 processes the received RF signal and provides I (inphase) and Q (quadrature) baseband signals, which are denoted as $I_{bb}$ and $Q_{bb}$. The receive chain 325 may perform low noise amplification, analog filtering, quadrature downconversion, etc., as desired or needed. An analog-to-digital converter (ADC) 327 digitizes the I and Q baseband signals at a sampling rate of $f_{adc}$ from a sampling clock 323 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 326, a pre-processor 329 performs pre-processing on the I and Q samples from the analog-to-digital converter (ADC) 327. For example, the pre-processor 329 may remove direct current (DC) offset, remove frequency offset, etc. An input filter 331 filters the samples from the pre-processor 329 based on a particular frequency response and provides input I and Q samples, which are denoted as $I_{in}$ and $Q_{in}$. The input filter 331 may filter the I and Q samples to suppress images resulting from the sampling by the analog-to-digital converter (ADC) 327 as well as jammers. The input filter 331 may also perform sample rate conversion, e.g., from 24× oversampling down to 2× oversampling. A data filter 333 filters the input I and Q samples from the input filter 331 based on another frequency response and provides output I and Q samples, which are denoted as $I_{out}$ and $Q_{out}$. The input filter 331 and the data filter 333 may be implemented with finite impulse response (FIR) filters, infinite impulse response (IIR) filters, or filters of other types. The frequency responses of the input filter 331 and the data filter 333 may be selected to achieve good performance. In one design, the frequency response of the input filter 331 is fixed and the frequency response of the data filter 333 is configurable.

An adjacent-channel-interference (ACI) detector 337 receives the input I and Q samples from the input filter 331, detects for adjacent-channel-interference (ACI) in the received RF signal, and provides an adjacent-channel-interference (ACI) indicator 339 to the data filter 333. The adjacent-channel-interference (ACI) indicator 339 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 333 may be adjusted based on the adjacent-channel-interference (ACI) indicator 339, to achieve desirable performance.

An equalizer/detector 335 receives the output I and Q samples from the data filter 333 and performs equalization, matched filtering, detection, and/or other processing on these samples. For example, the equalizer/detector 335 may implement a maximum likelihood sequence estimator (MLSE) that determines a sequence of symbols that is most likely to have been transmitted given a sequence of I and Q samples and a channel estimate.

Embodiments of the present invention may be used in conjunction and implemented with GSM technology. The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems. In the GSM/EDGE Radio Access Network (GERAN) specification, GPRS and EGPRS provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.).

GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (Mobile Station to Base Transceiver Station). For downlink communication, GSM 900 uses 935-960 MHz bands (base station 102 to wireless communication device 104). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) titled "Technical Specification 3rd Generation Partnership Project; Technical Specification Group GSM/EDGE Radio Access Network; Multiplexing and multiple access on the radio path (Release 4)," published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900 Similarly, ARFCN 128-251 are assigned to the channels of GSM 850, while ARFCN 512-885 are assigned to the channels of GSM 1800. Also, each base station 102 is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device 104 or user is assigned one or more time slot indices for the duration of a call. User-specific data for each wireless communication device 104 is sent in the time slot(s) assigned to that wireless communication device 104 and in TDMA frames used for the traffic channels.

Figure 4:
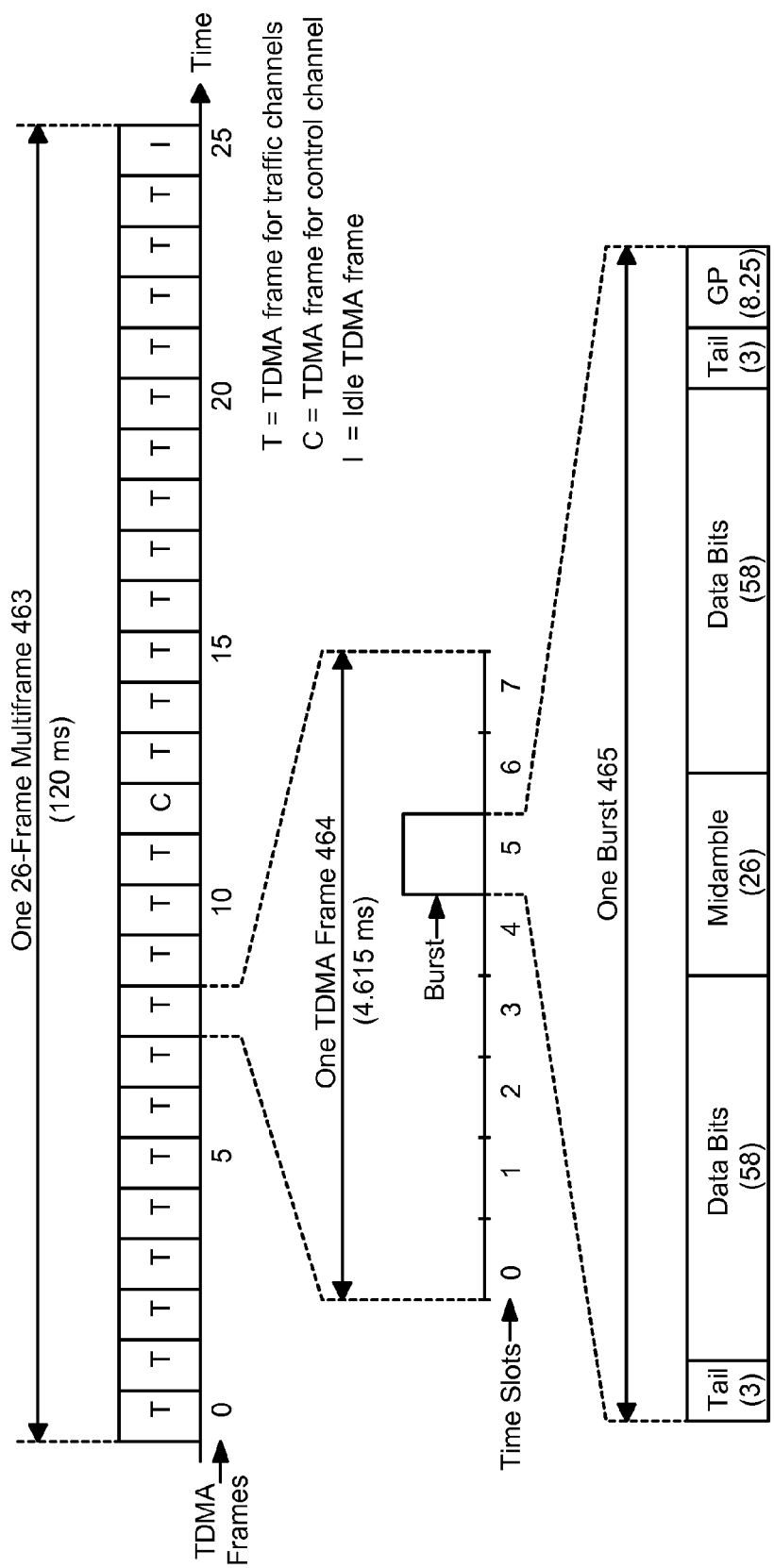
FIG. 4 illustrates example frame and burst formats in the Global System for Mobile Communication (GSM) according to some embodiments of the present invention.

FIG. 4 illustrates example frame and burst formats in the Global System for Mobile Communication (GSM) according to some embodiments of the present invention. The timeline for transmission is divided into multiframes 463 according to some embodiments of the present invention. For traffic channels used to transmit user-specific data, each multiframe 463 in this example includes 26 TDMA frames 464, which are labeled as TDMA frames 0 through 25. The traffic channels are sent in TDMA frames 0 through 11 and TDMA frames 13 through 24 of each multiframe 463. A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 465 in GSM. Each burst 465 includes two tail fields, two data fields, a training sequence (or midamble) field, and a guard period (GP). The number of symbols in each field is shown inside the parentheses. A burst 465 includes symbols for the tail, data, and midamble fields. No symbols are sent in the guard period. TDMA frames of a particular carrier frequency are numbered and formed in groups of 26 or 51 TDMA frames 464 called multiframes 463.

Figure 5:
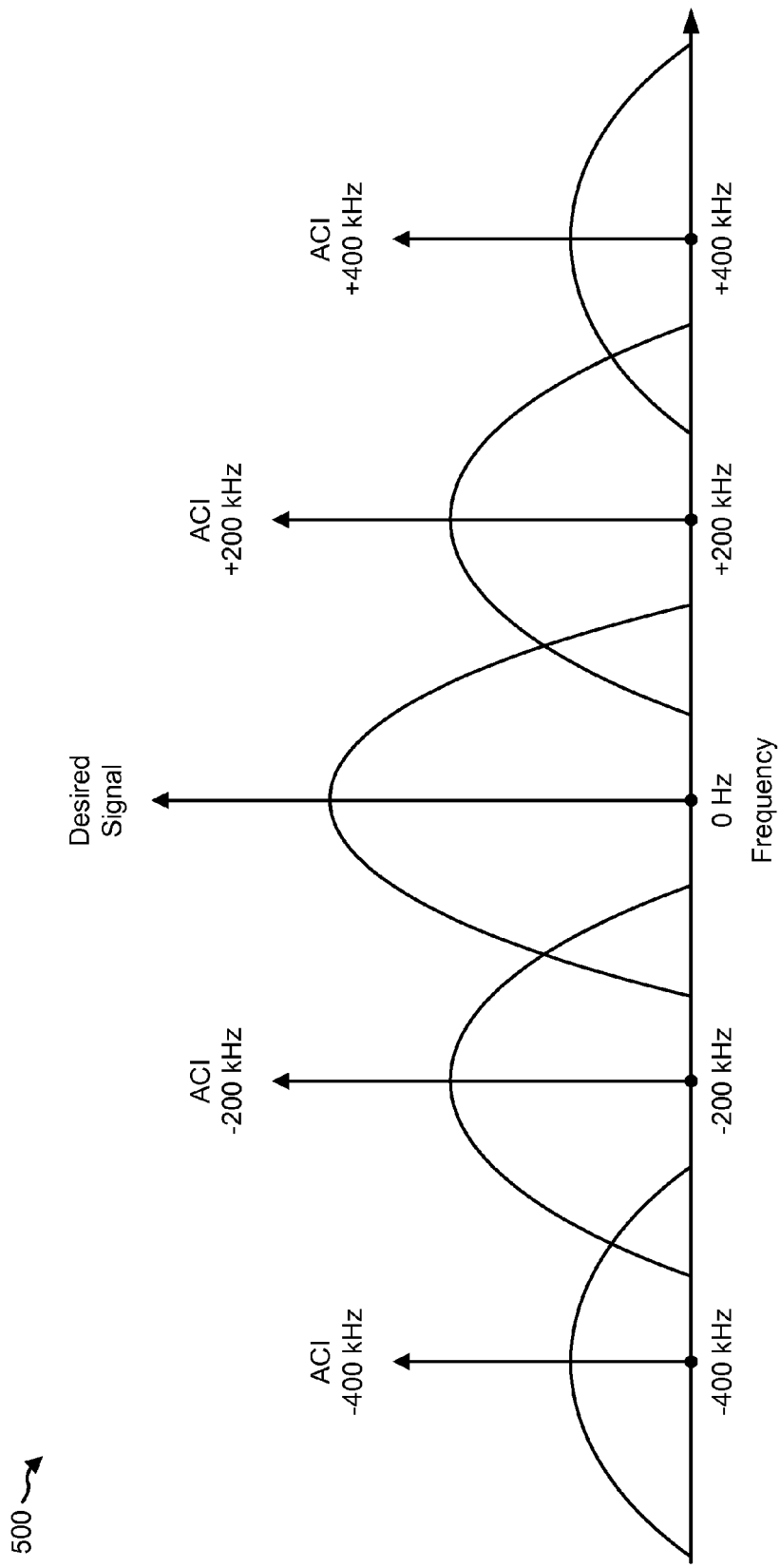
FIG. 5 illustrates an example spectrum in a GSM system according to some embodiments of the present invention.

FIG. 5 illustrates an example spectrum 500 in a GSM system according to some embodiments of the present invention. In this example, five RF modulated signals are transmitted on five RF channels that are spaced apart by 200 kHz. The RF channel of interest is shown with a center frequency of 0 Hz. The two adjacent RF channels have center frequencies that are +200 kHz and −200 kHz from the center frequency of the desired RF channel. The next two nearest RF channels (which are referred to as blockers or non-adjacent RF channels) have center frequencies that are +400 kHz and −400 kHz from the center frequency of the desired RF channel. There may be other RF channels in the spectrum 500, which are not shown in FIG. 5 for simplicity. In GSM, an RF-modulated signal is generated with a symbol rate of $f_{sym}=13000/48=270.8$ symbols/second (ksps) and has a −3 decibel (dB) bandwidth of up to 135 kHz. The RF-modulated signals on adjacent RF channels may thus overlap one another at the edges, as shown in FIG. 5.

In GSM/EDGE, frequency bursts (FB) are sent regularly by the base station 102 to allow wireless communication devices 104 to synchronize their local oscillator (LO) to the base station 102 local oscillator (LO), using frequency offset estimation and correction. These bursts include a single tone, which corresponds to all "0" payload and training sequences. The all zero payload of the frequency burst is a constant frequency signal, or a single tone burst. When in power mode, the wireless communication device 104 hunts continuously for a frequency burst from a list of carriers. Upon detecting a frequency burst, the wireless communication device 104 will estimate the frequency offset relative to its nominal frequency, which is 67.7 kHz from the carrier. The wireless communication device 104 local oscillator (LO) will be corrected using this estimated frequency offset. In power up mode, the frequency offset can be as much as +/−19 kHz. The wireless communication device 104 may periodically wake up to monitor the frequency burst to maintain its synchronization in standby mode. In the standby mode, the frequency offset is within ±2 kHz.

One or more modulation schemes are used in GERAN systems to communicate information such as voice, data, and/or control information. Examples of the modulation schemes may include Gaussian Minimum Shift Keying (GMSK), M-ary Quadrature Amplitude Modulation (QAM) or M-ary PSK (Phase Shift Keying), where $M=2^n$, with n being the number of bits encoded within a symbol period for a specified modulation scheme. GMSK is a constant envelope binary modulation scheme allowing raw transmission at a maximum rate of 270.83 kilobits per second (Kbps).

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with $3\pi/8$ rotation, while GMSK is a non-linear, Gaussian-pulse-shaped frequency modulation.

However, the specific GMSK modulation used in GSM can be approximated with a linear modulation (i.e., 2-level phase modulation with a π/2 rotation). The symbol pulse of the approximated GSMK and the symbol pulse of 8-PSK are identical. The EGPRS2 standard uses GMSK, QPSK, 8-PSK, 16-QAM, and 32-QAM modulations. The modulation type can be changed from burst to burst. Q-PSK, 8-PSK, 16-QAM, and 32-QAM modulations in EGPRS2 are linear, 4-level, 8-level, 16-level, and 32-level phase modulations with 3π/4, 3π/8, π/4, −π/4 rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GSMK and the symbol pulse of 8-PSK are identical. The symbol pulse of Q-PSK, 16-QAM, and 32-QAM can use spectrally narrow or wide pulse shapes.

Figure 6:
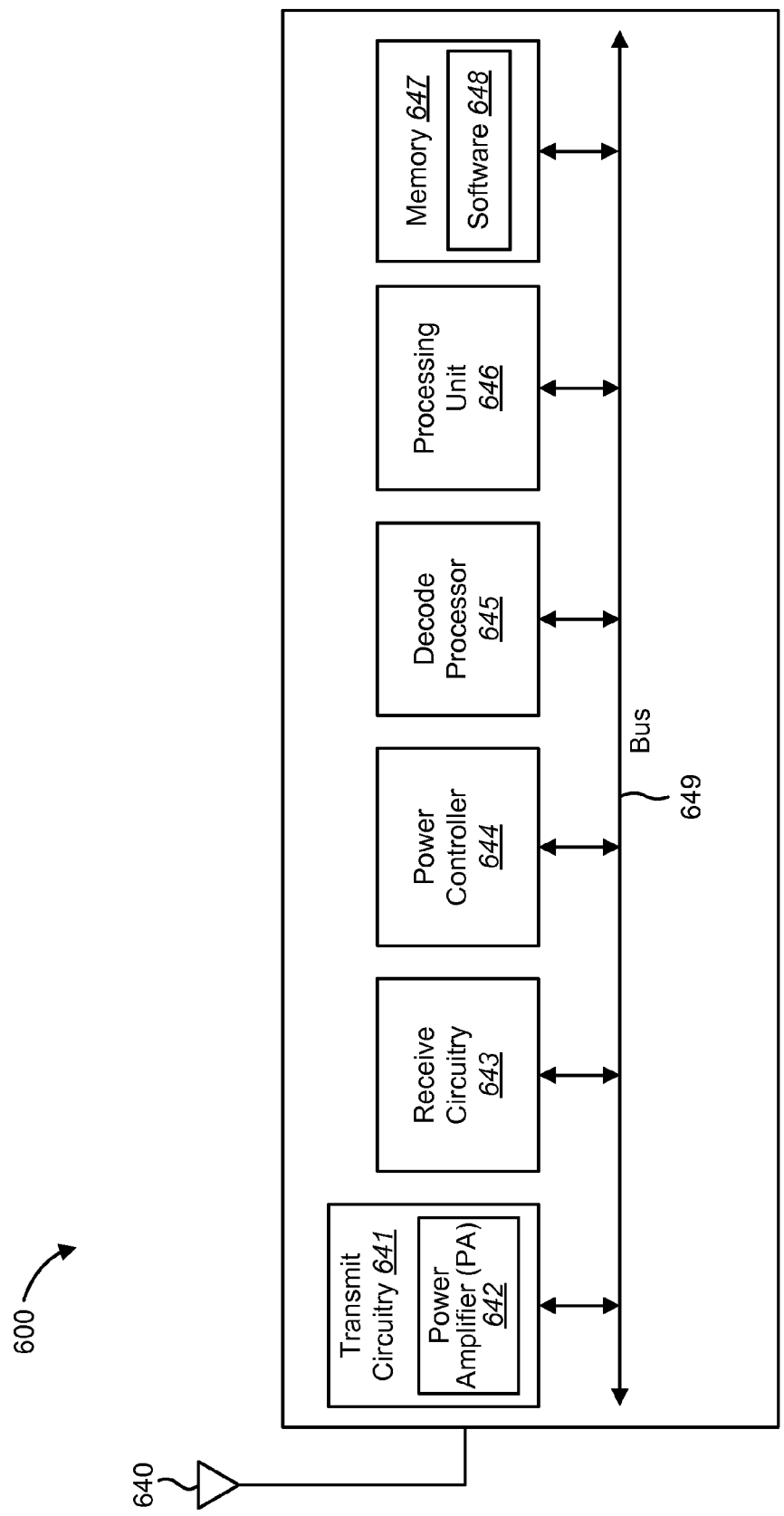
FIG. 6 illustrates an example of a wireless device according to some embodiments of the present invention that includes transmit circuitry (including a power amplifier), receive circuitry, a power controller, a decode processor, a processing unit for use in processing signals, and memory.

FIG. 6 illustrates an example of a wireless device 600 that includes transmit circuitry 641 (including a power amplifier (PA) 642), receive circuitry 643, a power controller 644, a decode processor 645, a processing unit 646 for use in processing signals, and memory 647 according to some embodiments of the present invention. The wireless device 600 may be a base station 102 or a wireless communication device 104. The transmit circuitry 641 and the receive circuitry 643 may allow transmission and reception of data, such as audio communications, between the wireless device 600 and a remote location. The transmit circuitry 641 and receive circuitry 643 may be coupled to an antenna 640.

The processing unit 646 controls operation of the wireless device 600. The processing unit 646 may also be referred to as a central processing unit (CPU). Memory 647, which may include both read-only memory (ROM) and random access memory (RAM), provides instructions and data to the processing unit 646. A portion of the memory 647 may also include non-volatile random access memory (NVRAM).

The various components of the wireless device 600 are coupled together by a bus system 649 which may include a power bus, a control signal bus, and a status signal bus in addition to a data bus. For the sake of clarity, the various busses are illustrated in FIG. 6 as the bus system 649.

The steps of the methods discussed may also be stored as instructions in the form of software 648 or firmware located in memory 647 in a wireless device 600. These instructions may be executed by the controller/processor(s) of the wireless device 600. Alternatively, or in conjunction, the steps of the methods discussed may be stored as instructions in the form of software 648 or firmware located in memory 647 in the wireless device 600. These instructions may be executed by the processing unit 646 of the wireless device 600 in FIG. 6.

Figure 7:
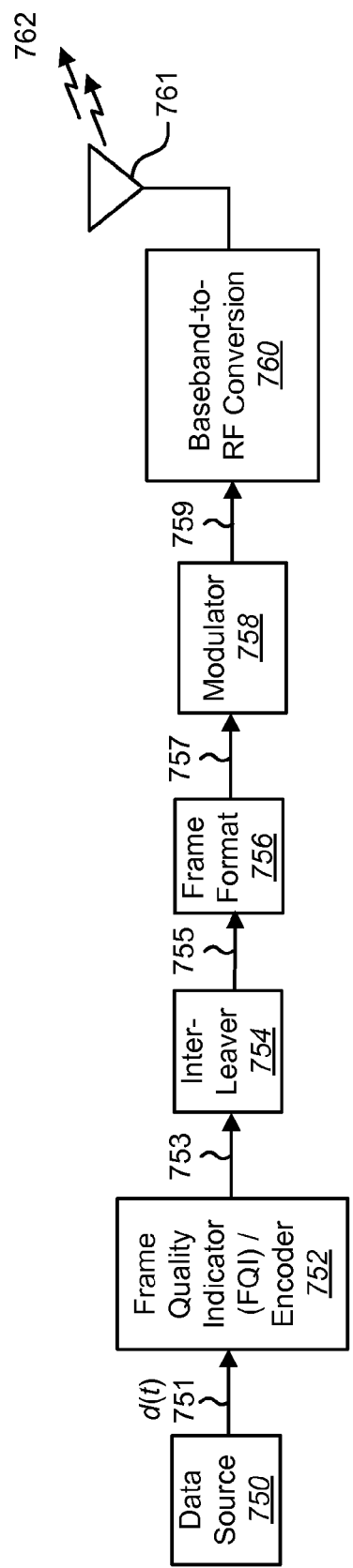
FIG. 7 illustrates an example of a transmitter structure and/or process according to some embodiments of the present invention.

FIG. 7 illustrates an example of a transmitter structure and/or process according to some embodiments of the present invention. The transmitter structure and/or process of FIG. 7 may be implemented in a wireless device such as a wireless communication device 104 or a base station 102. The functions and components shown in FIG. 7 may be implemented by software, hardware, or a combination of software and hardware. Other functions may be added to FIG. 7 in addition to or instead of the functions shown.

In FIG. 7, a data source 750 provides data d(t) 751 to a frame quality indicator (FQI)/encoder 752. The frame quality indicator (FQI)/encoder 752 may append a frame quality indicator (FQI) such as a cyclic redundancy check (CRC) to the data d(t). The frame quality indicator (FQI)/encoder 752 may further encode the data and frame quality indicator (FQI) using one or more coding schemes to provide encoded symbols 753. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ), and incremental redundancy repeat techniques. Different types of data may be encoded with different coding schemes.

An interleaver 754 interleaves the encoded data symbols 753 in time to combat fading and generates symbols 755. The interleaved symbols 755 may be mapped by a frame format block 756 to a pre-defined frame format to produce a frame 757. In an example, a frame format block 756 may specify the frame 757 as being composed of a plurality of sub-segments. Sub-segments may be any successive portions of a frame 757 along a given dimension, e.g., time, frequency, code, or any other dimension. A frame 757 may be composed of a fixed plurality of such sub-segments, each sub-segment including a portion of the total number of symbols allocated to the frame 757. In one example, the interleaved symbols 755 are segmented into a plurality S of sub-segments making up a frame 757.

A frame format block 756 may further specify the inclusion of, e.g., control symbols (not shown) along with the interleaved symbols 755. Such control symbols may include, e.g., power control symbols, frame format information symbols, etc.

A modulator 758 modulates the frame 757 to generate modulated data 759. Examples of modulation techniques include binary phase shift keying (BPS K) and quadrature phase shift keying (QPSK). The modulator 758 may also repeat a sequence of modulated data.

A baseband-to-radio-frequency (RF) conversion block 760 may convert the modulated data 759 to RF signals for transmission via an antenna 761 as signal 762 over a wireless communication link to one or more wireless device receivers.

Existing Global Systems for Mobile Communications (GSM) enhanced data rates for GSM Evolution (EDGE) (GE-RAN) wireless cellular networks are designed primarily to provide services to human users. The networks are dimensioned to serve a limited set of users per cell. Increasingly, networks need to provide a new class of service to users that include wireless communication devices 104 that do not require human intervention.

These wireless communication devices 104 may be referred to as machine type communication (MTC) devices or machine-to-machine communication (M2M) devices. One example of a machine type communication (MTC) device is a smart meter that automatically reports a measured reading to a machine type communication (MTC) server on a regular basis, by transmitting a report comprising MTC data. A machine type communication (MTC) server may be part of a core network. Thus, a machine type communication (MTC) device may report a measured reading to a base station 102 and the base station 102 may relay the measured reading to the machine type communication (MTC) server in the core network. Other examples of machine type communication (MTC) devices include personal health monitors, vehicle/goods tracking devices, environmental monitors, and security monitors.

It should be noted that smartphones and similar wireless communication devices 104 can exhibit, from the network's point of view, many of the characteristics of machine type communication (MTC) devices. In particular, software applications running on such devices may interact with the network to access remote servers, without human intervention. Examples of such an application include email clients and social networking applications that periodically poll a remote server to check for new emails or updates. For this reason, references to machine type communication (MTC) devices should be interpreted as including all mobile communication devices and applications that can exhibit MTC-device type behavior.

For machine type communication (MTC) device applications, it is possible to have a very large number of machine type communication (MTC) devices within a very small geographic area. Particularly, it is possible to have a large number of machine type communication (MTC) devices in the same cell. Each machine type communication (MTC) device may need to communicate with the network on a frequent basis, leading to overloading of the network.

Data reported by machine type communication (MTC) devices may be small and bursty in nature. For uplink data transfers, the base station 102 may use the downlink data traffic channel to transmit an acknowledgement message to each machine type communication (MTC) device. The acknowledgement message sent by the base station 102 may be a Packet Uplink Ack/Nack (PUAN).

FIGS. 8A and 8B illustrate call flow diagrams 800a-b for assigning a channel to a wireless communication device 804 in which embodiments of the present invention disclosed herein may be utilized. At a high level, the base station 802 and the wireless communication device 804 may correspond to the base station 102 and wireless communication device 104 described in connection with FIG. 1 above. In some configurations, the wireless communication system 100 may be a GERAN wireless communication system 100. However, it will be appreciated that other types of wireless communication systems 100 may be employed.

At any given time, a number of wireless communication devices 804 may require service (e.g., access) of the wireless communication system 100 for transmitting or receiving data. In this case of MTC devices, the service may be a packet service for sending and receiving packet data. When a wireless communication device 804 requires service of the wireless communication system 100, the wireless communication device 804 may transmit a channel request message, such as packet channel request message. A channel request message is typically transmitted over a control channel. Control channels are commonly used in wireless communication systems 100 for transmitting and receiving signaling information (i.e., control data). A base station 802 may receive the channel request message with the control data.

The wireless communication device 804 may transmit and receive packet data over a packet connection and/or circuit switched data over a circuit-switched connection. For simplicity, FIGS. 8A and 8B show packet connection technology. Again, it will be appreciated that other types of connections, such as circuit-switched connections, may be employed.

The base station 802 may also receive one or more other channel request messages transmitted by other wireless communication devices 804. For example, the base station 802 may receive a number m of channel requests transmitted by wireless communication devices 804 within a time period. The number m is a variable greater than or equal to zero; m depends on the number of wireless communication devices 804 within communication range of the base station 802 that transmit channel requests in the time period. The number m also depends on the number of channel requests that the base station 802 can receive in the time period. For example, if five wireless communication devices 804 transmit channel requests within the time period and the base station 802 is able to receive up to 50 channel requests within the period, then m is equal to 5. Alternatively, if 100 wireless communication devices 804 transmit channel requests within the time period and the base station 802 is able to receive up to 50 channel requests within the period, then m could be as high as 50.

The wireless communication system 100 may respond to up to a number n of the received channel requests by assigning network resources to the n wireless communication devices 804 that transmitted the n channel requests and then transmitting n assignment messages, each of which indicates that resources have been assigned to one of the n wireless communication devices 804. The number n therefore represents the number of channel assignments that the wireless communication system 100 will transmit within a given period of time. The number n is less than or equal to the number m. The number n is determined by the available network resources and by the available bandwidth of the access grant channel that carries the assignment message.

In the case of MTC devices, when a large number of MTC devices are located in a cell, the number n can have a maximum value that is significantly less than the maximum value of m. In that case, the wireless communication system 100 cannot respond to all of the channel requests it receives from MTC devices in the cell.

The base station 802 may respond to some or all of the m received channel request messages by transmitting an access message, such as an assignment message or an assignment reject message, over a control channel (e.g., an access grant channel). Each assignment message indicates that a wireless communication device 804 has been assigned a channel. The assignment reject message indicates that the wireless communication device 804 has not been assigned a channel, and is sent when the network does not have enough resource to allocate the requested channel.

In one configuration, as shown in FIG. 8a, the wireless communication device 804 may transmit 810 a channel request message 871a. The channel request message 871a may be an access request message, such as a request to establish a packet connection between the wireless communication device 804 and the base station 802. For example, the channel request message 871a may be in the form of a 'CHANNEL REQUEST message' or 'EGPRS PACKET CHANNEL REQUEST message.' The channel request message 871a may be transmitted 810 over a common control channel known as the random access channel (RACH). The RACH may include one slot of RACH data (RACH slots) per data frame.

The base station 802 may receive the channel request message 871a. For example, the base station 802 may receive the CHANNEL REQUEST message. The base station 802 may receive a channel request message 871a message in every slot of the RACH. In other words, in a 51-multiframe, it is possible for the base station 802 to receive up to 51 channel request message 871a in a situation in which 51 or more wireless communication devices 104 each transmit a channel request within the duration of the 51-multiframe.

In responding to the received channel request message 871a, the base station 802 may accept 814 the channel request. If the base station 802 accepts 814 the channel request, the base station 802 may transmit 818 an assignment message 873. For example, the base station 802 may transmit 818 an assignment message 873 in the form of an 'IMMEDIATE ASSIGNMENT message.' An IMMEDIATE ASSIGNMENT message indicates that the wireless communication device 804 has been assigned a channel. The base station 802 may transmit 818 the assignment message 873 over a common control channel called the access grant channel (AGCH).

The wireless communication device 804 may receive and process 820 the assignment message 873. Here, the wireless communication device 804 may respond to the assignment message 873 by transmitting 824 an uplink signal 875. For example, the wireless communication device 804 may transmit 824 an uplink signal 875 using the assigned channel indicated by assignment message 873.

In another configuration, as shown in FIG. 8b, the wireless communication device 804 may transmit 828 a channel request message 871b. The channel request message 871b may be a request to establish a packet connection between the wireless communication device 804 and the base station 802.

The base station 802 may receive the channel request message 871b. In responding to the received channel request message 871b, the base station 802 may reject 826 the channel request. If the base station 802 rejects 826 the channel request, the base station 802 may transmit 830 a reject message such as an assignment reject message 877. For example, the base station may transmit 830 an assignment reject message 877 in the form of an 'IMMEDIATE ASSIGNMENT REJECT message.' An IMMEDIATE ASSIGNMENT REJECT message indicates that the wireless communication device 804 has not been assigned a channel. The assignment reject message 877 message may be sent when the network does not have enough resource to allocate the requested channel. The base station 802 may send the assignment reject message 877 over a common control channel called the access grant channel (AGCH).

The wireless communication device 804 may receive the assignment reject message 877. The wireless communication device 804 may respond to an assignment reject message by halting further channel request messages. The wireless communication device 804 may enter 836 a wait state.

During the wait state, the wireless communication device 804 may not be able to communicate with the wireless communication system 100. In other words, during this defined time interval (the wait state period), the wireless communication device 804 may be unable to transmit messages to the base station 802. For example, the wireless communication device 804 will not attempt to establish a communication channel during the wait state period. Thus, a wireless communication device 804 in the wait state may be effectively suppressed or prevented from all channel request transmissions.

In some configurations, if a maximum number of rejections occur (i.e., the counter on the wireless communication device 804 has reached the maximum number of channel requests 871c), the wireless communication device 804 may trigger an autonomous cell reselection. However, cell reselection may not be possible if the wireless communication device 804 is fixed and unable to relocate to another cell.

In some configurations, when transmitting an assignment reject message 877, the base station 802 may indicate a wait state period. This wait state period may represent the time the wireless communication device 804 must remain in a wait state before transmitting another channel request 871. The wait state period can be fixed, for example, in accordance with a telecommunications standard. Additionally, the wireless communication system 100 may broadcast information about the wait state to wireless communication devices 804. For example the default period may be broadcast by the network or set by the assignment reject message 877.

Figure 9:
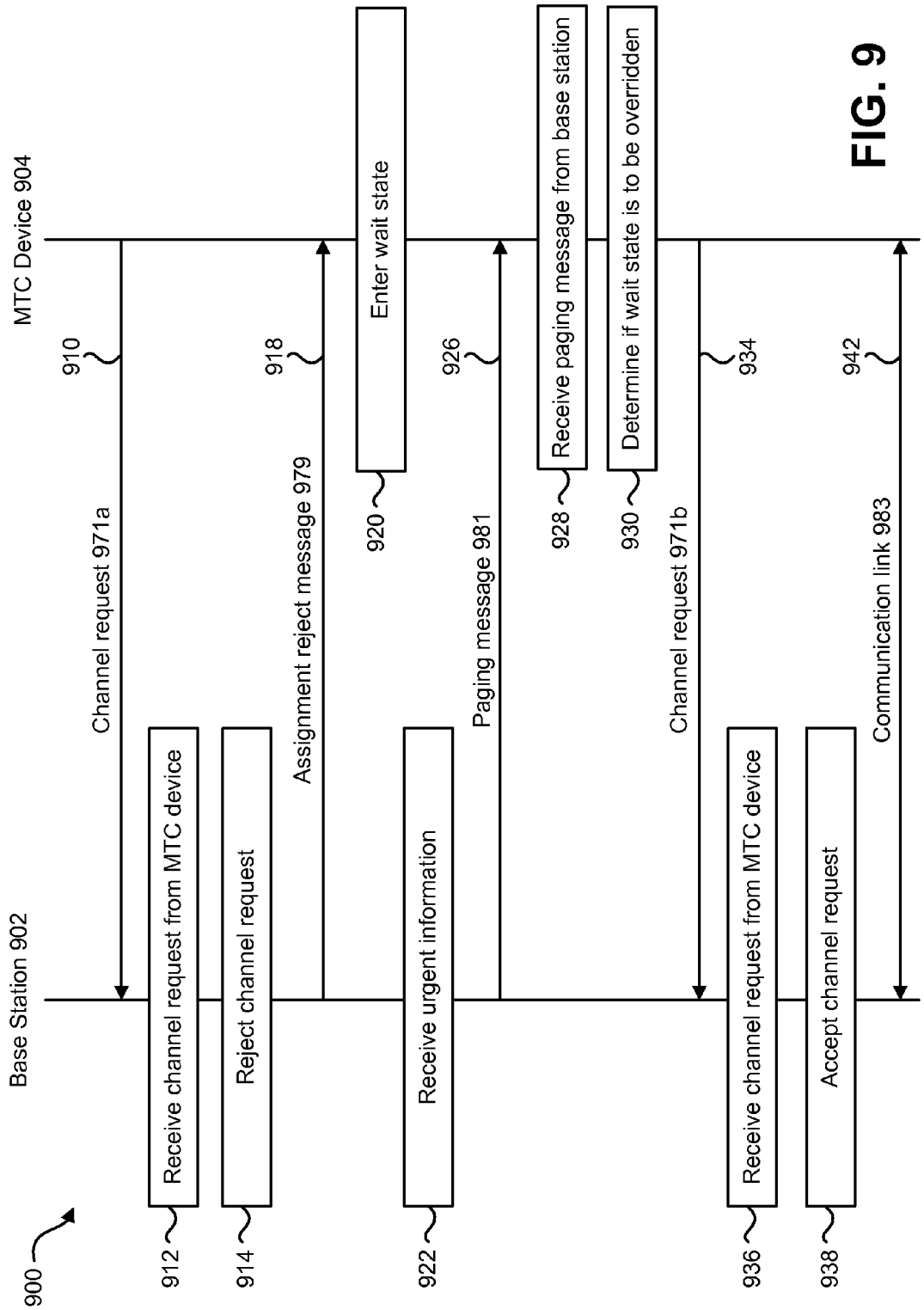
FIG. 9 illustrates a call flow diagram for allowing a rejected machine type communication (MTC) device access to a communication channel according to some embodiments of the present invention.

FIG. 9 illustrates a call flow diagram 900 for allowing a rejected wireless communication device access to a communication channel according to some embodiments of the present invention. The base station 902 and MTC device 904 of FIG. 9 may correspond to the base station 102 and wireless communication device 104 described in connection with FIG. 1, respectively. For example, the MTC device 904 may be a smart meter that automatically reports a measured reading to an MTC server on a regular basis, by transmitting a report that includes MTC data. The MTC device 904 may be a personal health monitor, vehicle/goods tracking device, environmental monitor, security monitor, etc.

The MTC device 904 may transmit 910 a channel request 971a to the base station 902 to establish a communication channel. The channel request 971a may include a request for network resources and access. The base station 902 may receive 912 the channel request 971a from the MTC device 904 and may reject 914 the channel request 971a. The base station 902 may transmit 918 an assignment reject message 979 to the MTC device 904.

The MTC device 904 may enter 920 a wait state. The duration of the wait state may be indicated by the assignment reject message 979. During the wait state period, the MTC device 904 does not attempt to establish a channel with the base station 902. In other words, the MTC device 904 does not attempt to transmit messages relating to channel establishment during the wait state.

While the MTC device 904 is in a wait state, the base station 902 may receive 922 urgent information intended for the MTC device 904. When the urgent or high-priority information intended for the MTC device 904 arrives at the base station 902, the base station 902 may generate an urgent message in the form of a paging message 981. The paging message 981 may be addressed to the MTC device 904. The paging message 981 may include a wait state override indicator. In some configurations, the wait state override indicator may include an override flag having a value set to logical true. In other words, the override flag may be set to equal "1."

The base station 902 may transmit 926 the paging message 981 to the MTC device 904. The paging message 981 may be transmitted 926 over the paging channel. The MTC device 904 may receive 928 the paging message 981 from the base station 902. The MTC device 904 may determine 930 if the wait state is to be overridden. For example, the MTC device 904 may determine that the override flag is equal to "1." Upon determining 930 that the wait state is to be overridden, the MTC device 904 may attempt to establish a communication channel with the base station 902.

For example, the MTC device 904 may transmit 934 another channel request message 971b. The base station 902 may receive 936 the channel request 971b and accept 938 the channel request 938. The base station 902 and the MTC device 904 may then attempt to establish 942 a communication link 983 over a communication channel. This attempt to establish 942 a communication channel can be done in any manner acceptable under the communication standard according to which the MTC device 904 and base station 902 operate. For example, the base station 902 may send an access message, such as an assignment message 873, as illustrated above in FIG. 8, assigning the MTC device 904 to use a specified communication channel.

Paging messages can be utilized in varying manners according to some embodiments of the present invention. For example, in some configurations, the paging message 981 may indicate the cancellation of the wait state. In other configurations, the paging message 981 indicates that the wait state override is temporary and relates only to a channel that the paging message 981 is seeking to initiate. In other words, the wireless communication device 104 may not override the wait state to establish a communication channel for any purpose other than that specified in the paging message 981. For example, a wireless communication device 104, such as an MTC device 904, should not use the wait state override as an opportunity to transmit the channel request 971a for the establishment of a communication channel that initially resulted in the assignment reject message 979.

Like paging channels, wait states can be used in varying manners. For example, in some configurations, the wait state period is temporary and only allows for establishing a communication channel for the purpose of responding to the urgent information. The MTC device 904 may re-enter the wait state once the communication link 983 resulting from the urgent or high-priority information has been closed and/or released. Then, at the expiry of the wait state period, the MTC device 904 may come out of the wait state and again attempt to initiate establishment of the communication channel that was previously rejected by the base station 902 (e.g., send another channel request 971).

The wait state deactivation can be temporary, semi-permanent, or permanent. The duration of the wait state period may be indicated by the wait state override indicator or by a setting or parameter stored in the MTC device 904. For example, the MTC device 904 may include a default value for the duration of the wait state period.

The duration of the wait state may have different possible values (i.e., a variable duration). For example, the wait state override indicator may indicate a time period during which the wait state shall be affected. The indicated time period may have more than one possible value, which might depend on a priority assigned to the MTC device 904. For example, the network may assign a high priority value to a wireless communication device 104 that has been associated with a high risk, such as a health monitor used to monitor the health of a patient who has fallen ill or who has not responded to some form of communication (e.g. a letter or a telephone call).

The indicated time period may depend upon a frequency with which a wireless communication device 104 has transmitted requests for service (e.g. channel requests 971). For example, a sudden increase in a person's heart beat may be used to indicate a likely emergency situation. This could apply to human-related emergencies (e.g. health) or to machine-related emergencies such as fault-reporting from an important piece of industrial or safety equipment such as a traffic light, a level crossing, or an elevator in a high-rise building.

The wait state override indicator may indicate wait states for multiple wireless communication devices 104. For example, multiple wireless communication devices 104 in a group may be signaled to override a wait state and attempt to establish communication with the base station 902. In this case, fewer paging messages 981 may be used to reach a plurality of wireless communication devices 104. In some configurations, a single wait state override indicator for a paging message 981 may indicate that the wait states of all wireless communication devices 104 that are able to receive the message (e.g. paging message 981) should override the wait state. In this manner, the network may transmit emergency information to all wireless communication devices 104 of a group, to all wireless communication devices 104 of a communication system, or to as many wireless communication devices 104 as possible of the group or system.

Figure 10:
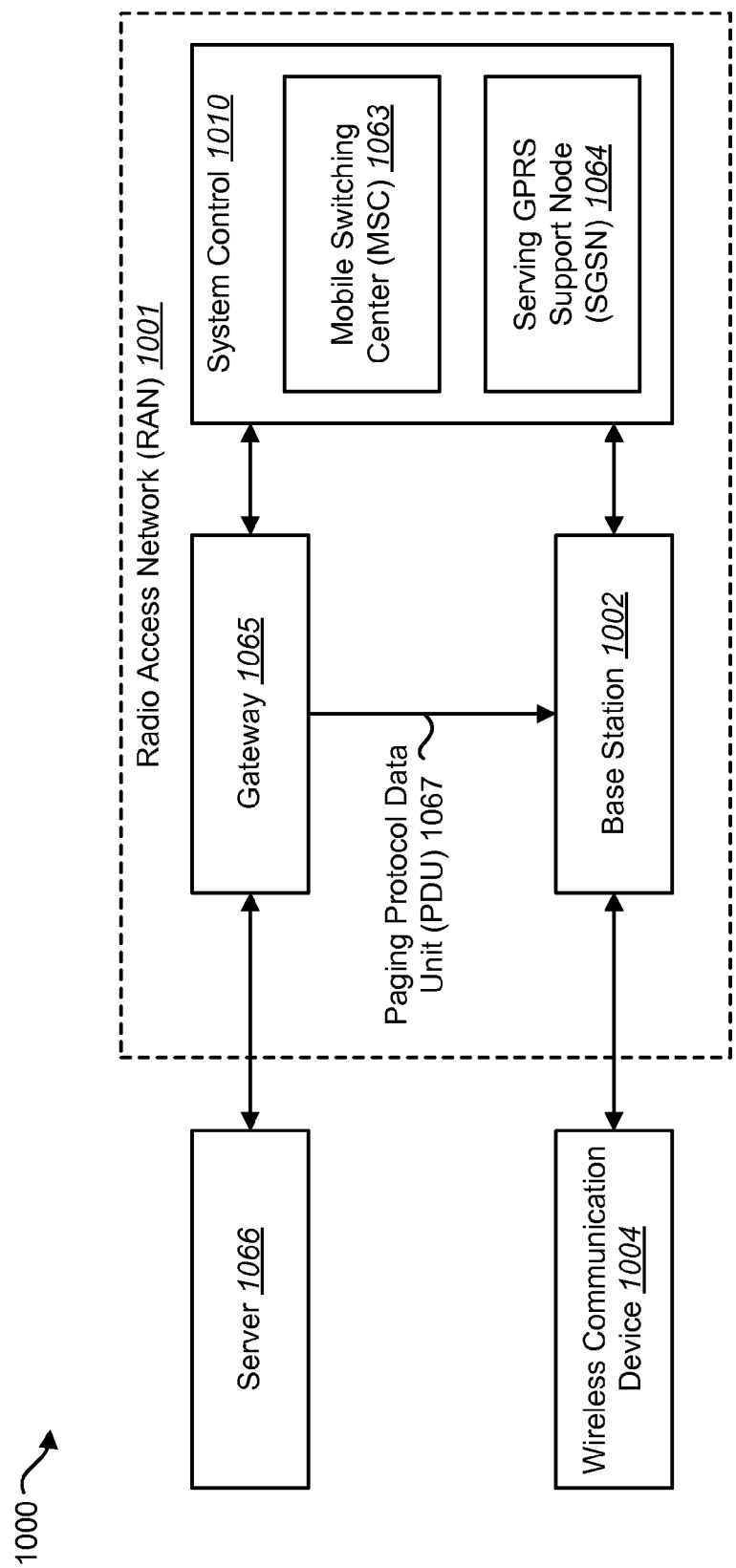
FIG. 10 illustrates a block diagram of one configuration of a wireless communication system configured for allowing a rejected wireless communication device access to a communication channel according to some embodiments of the present invention.

FIG. 10 illustrates a block diagram of one configuration of a wireless communication system 1000 configured for allowing a rejected wireless communication device 1004 access to a communication channel according to some embodiments of the present invention. The wireless communication system 1000 may include a radio access network (RAN) 1001, a server 1066, and a wireless communication device 1004. As used herein, a radio access network (RAN) 1001 may not include a wireless communication device 1004. In other words, wireless communication devices 1004 are located outside the radio access network (RAN) 1001.

The radio access network (RAN) 1001 may include a gateway 1065, a system control 1010, and base station 1002. The base station 1002 and system control 1010 may correspond to the base station 102 and system control 110 described in connection with FIG. 1, respectively. The system control 1010 may include a mobile switching center (MSC) 1063 and a serving GPRS support node (SGSN) 1064.

The server 1066 and the wireless communication device 1004 may be located external to the radio access network (RAN) 1001. The wireless communication device 1004 may correspond to the wireless communication device 104 described in connection with FIG. 1. In some configurations, the server 1066 may be an MTC server and the wireless communication device 1004 may be an MTC device 904.

The server 1066 may indicate an urgent or high-priority message directed to the wireless communication device 1004. The urgent message may be initiated outside the radio access network (RAN) 1001. For example, the urgent message may be initiated at the server 1066 via an IP network that couples the server 1066 and the gateway 1065. An IP header associated with, or included in, the urgent message may specify that urgent delivery to the wireless communication device 1004 is needed.

The urgent message may be passed on by the gateway 1065 to the base station (e.g., base station subsystem (BSS)) 1002, via a paging protocol data unit (PDU) 1067. Alternatively, the urgent message may be passed on by the gateway 1065 to the base station 1002 via a paging protocol data unit (PDU) located in the Serving GPRS Support Node (SGSN) 1064. An urgent message that is passed via the paging protocol data unit (PDU) located in the Serving GPRS Support Node SGSN) 1064 is described below in FIG. 11.

The paging protocol data unit (PDU) 1067 may include an override wait state flag. For example, the override wait state flag may have a logical true value that indicates that the wait state of the wireless communication device 104 is to be overridden to allow for communication between the wireless communication device 1004 and the server 1066 via the base station 1002 and the gateway 1065.

The paging protocol data unit (PDU) 1067 may be sent to the base station 1002 from the gateway 1065. The base station 1002 may transmit the paging protocol data unit (PDU) 1067 wirelessly to the wireless communication device 1004. The wireless communication device 1004 may decode the message and, based on the value of the override flag, determine that the wait state should be overridden. The wireless communication device 1004 may then temporarily override the wait state and attempt to establish a communication channel with the base station 1002 or a base station substation (BSS).

Once the communication channel is established, the base station 1002 may transmit the urgent message to the wireless communication device 1004. Once the urgent message has successfully been transmitted and the communication channel has been closed, the wireless communication device 1004 may resume the wait state until the wait state period has elapsed. Then, the wireless communication device 1004 can re-transmit a channel request 871 that was previously rejected by the network. The wireless communication device 1004 may also submit a new channel request 871.

Figure 11:
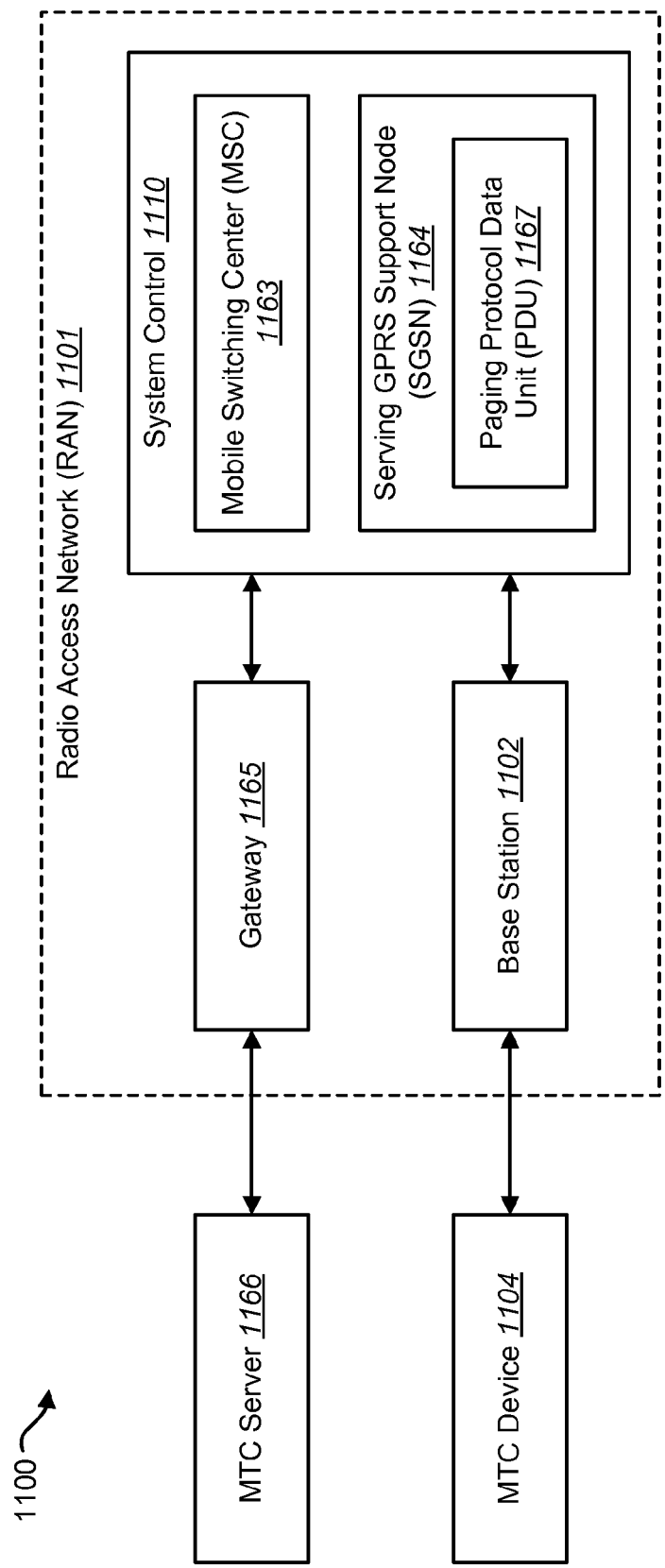
FIG. 11 illustrates a block diagram of a configuration of a wireless communication system configured for allowing a rejected machine type communication (MTC) device access to a communication channel according to some embodiments of the present invention.

FIG. 11 illustrates a block diagram of a configuration of a wireless communication system 1100 configured for allowing a rejected machine type communication (MTC) device 904 access to a communication channel according to some embodiments of the present invention. The wireless communication system 1100 may include a radio access network (RAN) 1101, an MTC server 1166, and an MTC device 1104.

The radio access network (RAN) 1101 may include a gateway 1165, a system control 1110, and base station 1102. The system control 1110 may include a mobile switching center (MSC) 1163 and a serving GPRS support node (SGSN) 1164. The base station 1102, system control 1110, mobile switching center (MSC) 1163, serving GPRS support node (SGSN) 1164, and gateway 1165 may correspond with similar elements 1002, 1010, 1063, 1064, and 1065 described in connection with FIG. 10.

An MTC server 1166 and an MTC device 1104 may be located external to the radio access network (RAN) 1101. The MTC device 1104 may correspond to the wireless communication device 104 described in connection with FIG. 1. The MTC device 1104 may be an eHealth Device, a Smart meter, etc.

The Serving GPRS Support Node (SGSN) 1164 may generate a paging protocol data unit (PDU) 1167. In one configuration, the Serving GPRS Support Node (SGSN) 1164 may generate a wait period override flag and/or set a wait period override flag to the value of "1," which indicates to the MTC device 1104 to override the wait state. The Serving GPRS Support Node (SGSN) 1164 may place the wait period override flag in the paging protocol data unit (PDU) 1167.

As an example, an MTC device 1104 may be health monitor connected to a hospital bed in a patient's home. The MTC device 1104 may be in a wait state after receiving multiple assignment reject messages 877. As a result of the MTC device 1104 being immobile, the MTC device 1104 cannot employ a cell reselection process to access a communication channel. Thus, the MTC device 1104 must wait until the wait state period elapses and again attempt to connect to the network. The patient's data may not be updated for hours, days, or weeks. Likewise, critical messages, updates, and instructions from the patient's doctor may not be received in a timely manner.

The MTC server 1166 may trigger an alarm if the patient's data is not updated within a certain time. Additionally, the MTC server 1166 may need to send an update, such as a firmware update, a message to the patient, etc., to the MTC device 1104. The MTC server 1166 may contact the system control 1110 via the gateway 1165 to request access to the MTC device 1104. The Serving GPRS Support Node (SGSN) 1164 may generate a paging protocol data unit (PDU) 1167 indicating to the MTC device 1104 to override the wait state. The base station 1102 may transmit a paging message 981 to the MTC device 1104. The paging message 981 may include the paging protocol data unit (PDU) 1167. As a result, the MTC device 1104 may attempt to establish communication with the base station 1102 in order to send MTC data to or receive MTC data from the MTC server 1166. Once the MTC device 1104 has finished communications with the MTC server 1166, the MTC device 1104 may re-enter the wait state.

Figure 12:
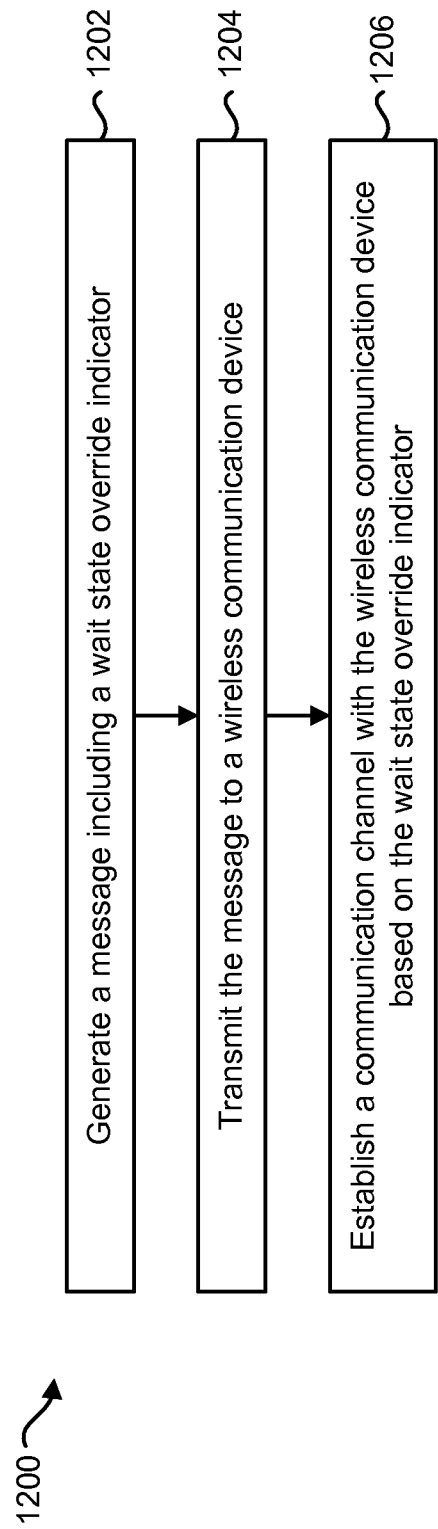
FIG. 12 is a flow diagram of a method for establishing a communication channel with a wireless communication device according to some embodiments of the present invention.

FIG. 12 is a flow diagram of a method 1200 for establishing a communication channel with a wireless communication device 104 according to some embodiments of the present invention. The method 1200 may be performed by a base station 102 or some other component in a wireless communication system 100, such as a system control 110. The base station 102 may generate 1202 a message that includes a wait state override indicator. For example, the message may be a paging message 981 and the wait state override indicator may be a wait state override flag.

The base station 102 may transmit 1204 the message to a wireless communication device 104. In some configurations, the wireless communication device 104 may be an MTC device 904.

The base station 102 may establish 1206 a communication link 983 over a communication channel with the wireless communication device 104 based on the wait state override indicator. For example, the wireless communication device 104 may send a channel request 871 and the base station 102 may grant the request by sending an assignment message 873 and allow the wireless communication device 104 access to requested resources over the communication channel.

Figure 13:
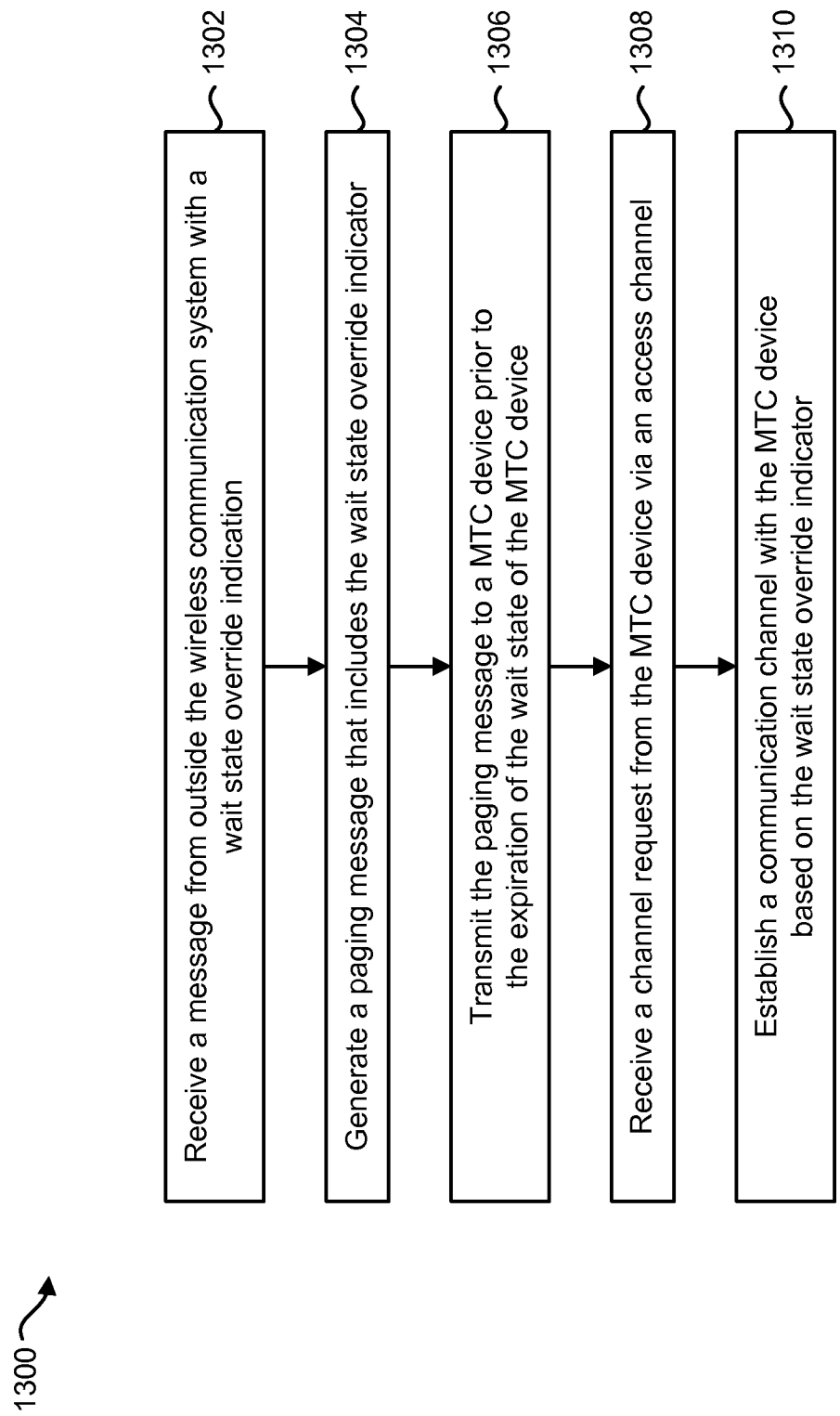
FIG. 13 is a flow diagram of a method for establishing a communication channel with a wireless communication device according to some embodiments of the present invention.

FIG. 13 is a flow diagram of a more specific method 1300 for establishing a communication channel with a wireless communication device 104 according to some embodiments of the present invention. The method 1300 may be performed by a base station 102 or some other component in a radio access network (RAN) 1001, such as a system control 1010. For example, the method 1300 may be performed by a serving GPRS support node (SGSN) 1164. In some configurations, the method 1300 may be performed by multiple components in the radio access network (RAN) 1001, such as by the Serving GPRS Support Node (SGSN) 1164 and the base station 102.

The Serving GPRS Support Node (SGSN) 1164 may receive 1302 a message from outside the radio access network (RAN) 1001. The message may be an urgent information message and may include a wait state override indicator. For example, an MTC server 1166 may notify the radio access network (RAN) 1001 that it needs to contact an MTC device 1104. The radio access network (RAN) 1001 may forward the message to the Serving GPRS Support Node (SGSN) 1164.

The Serving GPRS Support Node (SGSN) 1164 may generate 1304 a paging message 981 that includes the wait state override indicator. The wait state override indicator may be a wait state override flag. The flag may be in a paging message 981 and may be set to logical true. In other words, the flag may be set to indicate to an MTC device 1104 to override the wait state.

The Serving GPRS Support Node (SGSN) 1164 may transmit 1306, via the base station 102, the paging message 981 to an MTC device 1104. The paging message 981 may be transmitted over a paging channel. The paging message 981 may be transmitted 1306 to the MTC device 1104 while the MTC device 1104 is in a wait state. In other words, the paging message 981 may be transmitted 1306 to the MTC device 1104 prior to the expiration of the wait state period of the MTC device 1104. In some instances, the paging message 981 may be transmitted to the MTC device 1104 after the expiration of the wait state period of the MTC device 1104.

The Serving GPRS Support Node (SGSN) 1164 may receive 1308 a channel request 871 from the MTC device 1104. The channel request 871 may be received via an access channel. The channel request 871 may be in response to the paging message 981. For example, the MTC device 1104 may have been in the wait state before receiving the paging message 981. After receiving the paging message 981, the MTC device 1104 sends a channel request 871 as indicated in the paging message 981.

The Serving GPRS Support Node (SGSN) 1164 may establish 1310 a communication channel with the MTC device 1104 based on the wait state override indicator. For example, after the MTC device 1104 has sent a channel request 971, the radio access network (RAN) 1001 may grant the request by sending an assignment message 873 and allow the MTC device 1104 to establish a communication link 983 over a communication channel with the base station 1002 to access requested resources.

Figure 14:
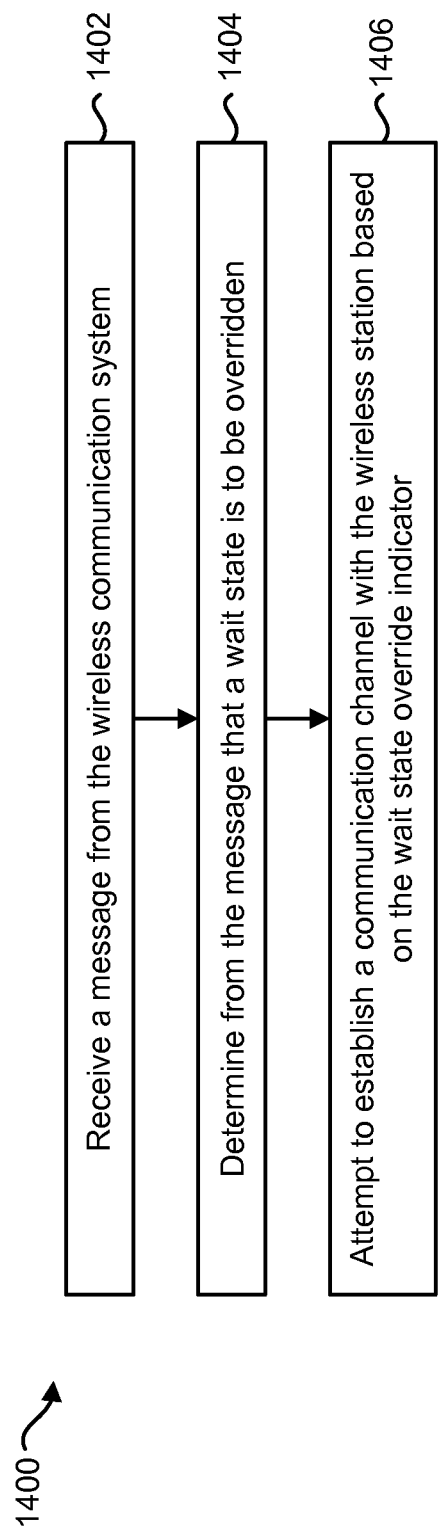
FIG. 14 is a flow diagram of a method for establishing a communication channel by a wireless communication device according to some embodiments of the present invention.

FIG. 14 is a flow diagram of a method 1400 for establishing a communication channel by a wireless communication device 104 according to some embodiments of the present invention. The method 1400 may be performed by a wireless communication device 104.

The wireless communication device 104 may receive 1402 a message from the wireless communication system 100. For example, the wireless communication device 104 may receive 1402 a message from the radio access network (RAN) 1001. In one configuration, the wireless communication device 104 may receive 1402 the message from the gateway 1065, the system control 1010 (that includes the mobile switching center (MSC) 1063 and the Serving GPRS Support Node (SGSN) 1064) and/or the base station 1002. In some configurations, the message may be a paging message 981 and may include a wait state override indicator.

The wireless communication device 104 may determine 1404 from the message that a wait state is to be overridden. The wireless communication device 104 may determine 1404 that the message includes a wait state override indicator and that the wait state override indicator indicates to the wireless communication device 104 to override the wait state and establish communications with the radio access network (RAN) 1001.

The wireless communication device 104 may attempt 1406 to establish a communication channel with the radio access network (RAN) 1001 based on the wait state override indicator. For example, the wireless communication device 104 may be in a wait state when the message is received and, based on the wait state override indicator, exit the wait state and send a channel request 871 to a base station 102. In this manner, the wireless communication device 104 may attempt 1406 to establish a communication channel with the wireless communication system 100, such as the radio access network (RAN) 1001.

Figure 15:
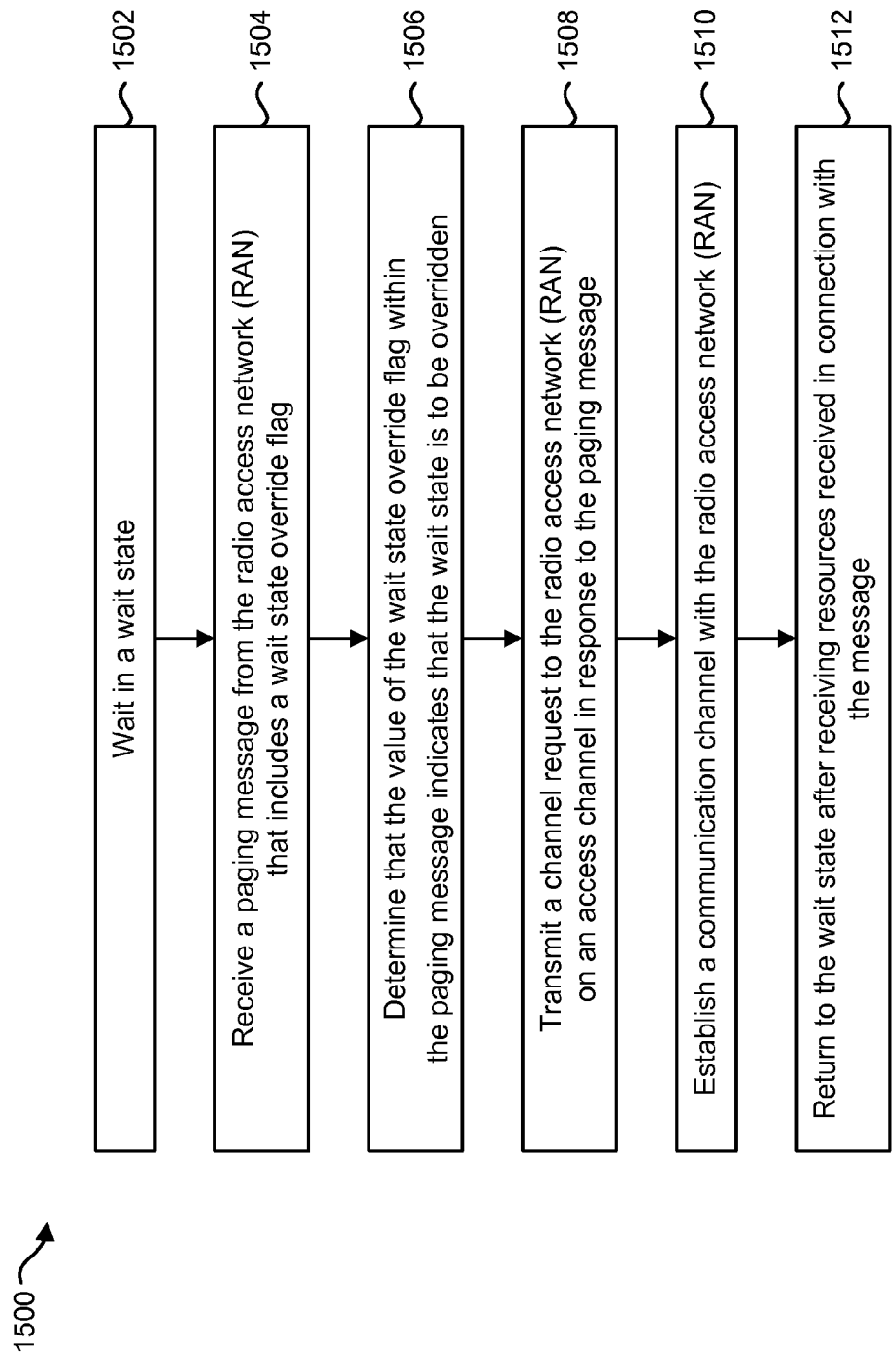
FIG. 15 is a flow diagram of another method for establishing a communication channel by a wireless communication device according to some embodiments of the present invention.

FIG. 15 is a flow diagram of yet another more detailed method 1500 for establishing a communication channel on a wireless communication device 104 according to some embodiments of the present invention. The method 1500 may be performed by a wireless communication device 104, such as an MTC device 904.

The MTC device 904 may be waiting 1502 in a wait state. While in the wait state, the MTC device 904 may be prevented from establishing a communication channel with a base station 102. In other words, the MTC device 904 may be prevented from transmitting messages unless the wait state is overridden or the wait state period has expired.

The MTC device 904 may receive 1504 a paging message 981 from a radio access network (RAN) 1001. The paging message 981 may include a wait state override indicator. The wait state override indicator may be a wait state override flag. The flag may be in a paging message 981 and may be set to a logical true value. In other words, the flag may be set to indicate to an MTC device 904 to override the wait state.

The MTC device 904 may determine 1506 that the value of the wait state override flag within the paging message 981 indicates that the wait state is to be overridden. In other words, the MTC device 904 may determine 1506 that the wait state override indicator is set to indicate to the MTC device 904 to override the wait state and establish communications with the radio access network (RAN) 1001.

The MTC device 904 may transmit 1508 a channel request 871 for resources on an access channel in response to the paging message 981. The MTC device 904 may establish 1510 a communication channel with the radio access network (RAN) 1001.

After the communication channel has been established and the MTC device 904 has received the requested resources, the MTC device 904 may return 1512 to the wait state. The MTC device 904 may remain in the wait state until the wait state period has elapsed.

Thus, according to the embodiments of the present invention, an MTC device 904 may be interrupted from a wait state to communicate with the radio access network (RAN) 1001. Then, once communication is complete, the MTC device 904 may re-enter the wait state. In this manner, MTC servers 1166 and other devices that need to contact the MTC device 904 may be able to communicate with the MTC device 904, even when the MTC device 904 is in a wait state.

Exemplary Tables and Listings

The systems and methods described herein can be applied to a wireless communication system 100 and/or radio access network (RAN) 1001 that operates according to GSM/EDGE Radio Access Network (GERAN) standards. For example, a wireless communication device 104 may override the wait state and access the communication channel if instructed to do so.

In some configurations, paging rest octets information elements may be added to a paging message 981. These rest octets information elements may include PAGING REQUEST TYPE 1 message rest octets, PAGING REQUEST TYPE 2 message rest octets, and/or PAGING REQUEST TYPE 3 message rest octets. Known paging request types 1, 2, and 3 rest octets are detailed in specification 3GPP TS 44.018 (Release 9), section 10.5.2.

In some configurations, such as in a GERAN system, data is transmitted over channels that comprise physical channels and logical channels. A physical channel includes one or more timeslots and one or more frequencies. An example of a physical channel is a control channel for transmitting control data using a downlink frequency and a downlink time slot and for transmitting control data using a corresponding uplink frequency and uplink time slot. Information is exchanged between a wireless communication device 104 and a base station 102 as frames. Furthermore, four frames may be combined to form a radio block. According to the present GERAN standards, an access message (e.g., assignment message 873 and/or assignment reject message 877) occupies at least one radio block.

Embodiments of the present invention described herein may require changes to the mobile switching center (MSC) 1063 to base station control (BSC) interface. In some known configurations, the mobile switching center (MSC) 1063 may signal to the base station 102 the reason for the paging via a paging message 981. A Paging Information element may be an example of a paging message 981.

Table 1 below illustrates a paging information message according to embodiments of the present invention. Modifications from known approaches are shown in Table 1 in bold.

TABLE 1

| | Frame | | | | | | | |
|---|---|---|---|---|---|---|---|---|
| | 8 | 7 | 6 | 5 | 4 | 3 | 2 | 1 |
| Octet 1 | | | | Element identifier | | | | |
| Octet 2 | | spare | | | | OWP | Paging Cause | VGCS/VBS |

Table 1 illustrates a paging information message with 8 frames, octet 1, and octet 2. The frame may correspond to bit fields. Octet 1 includes an element identifier in frames 1-8. Octet 2 includes voice group call service/voice broadcast service (VGSC/VBS) in frame 1, a paging cause in frames 2 and 3, and an override wait period (OWP) in frame 4 and spare space in frames 5-8.

As shown in Table 1 above, an Override Waiting Period (OWP) field may be added to the paging information. For example, the Override Waiting Period (OWP) field may be added to frame 4 of the paging information message. In other words, the Override Waiting Period (OWP) may be the fourth bit of octet 2. The Override Waiting Period (OWP) may signal to wireless communication device 104 to override the wait state by responding to the paging message 981 regardless of the remaining wait period. The wireless communication device 104 may respond by attempting to establish access on a communication channel.

Override Waiting Period (OWP) set to "0" may indicate that the wireless communication device 104 is not allowed to override a waiting period. Alternatively, Override Waiting Period (OWP) set to "1" may indicate that the wireless communication device 104 is allowed to override a waiting period Embodiments of the present invention described herein may require changes to the Serving GPRS Support Node (SGSN) 1064 to base station control (BSC) interface. In some known configurations, the Serving GPRS Support Node (SGSN) 1064 may signal to the base station 102 the reason for the paging, which could be PAGING PS or PAGING CS PDUs. As shown in Table 2 below, Override Waiting Period (OWP) information may be added to paging PAGING PS content to signal to a wireless communication device 104 that it may respond to this paging request regardless of the remaining wait period. Modifications to known approaches are bolded, as indicated in Table 2 below.

TABLE 2

| Information elements | Type/ Reference | Presence | Format | Length |
|---|---|---|---|---|
| PDU type | PDU type/11.3.26 | M | V | 1 |
| IMSI | IMSI/11.3.14 | M | TLV | 5-10 |
| DRX Parameters | DRX Parameters/ 11.3.11 | O | TLV | 4 |
| BVCI a) | BVCI/11.3.6 | C | TLV | 4 |
| Location Area (note) | Location Area/11.3.17 | C | TLV | 7 |
| Routing Area (note) | Routing Area/11.3.31 | C | TLV | 8 |
| BSS Area Indication (note) | BSS Area Indication/11.3.3 | C | TLV | 3 |
| PFI | PFI/11.3.42 | O | TLV | 3 |
| ABQP | ABQP/11.3.43 | O | TLV | 13-? |
| QoS Profile | QoS Profile/11.3.28 | M | TLV | 5 |
| P-TMSI | TMSI/11.3.36 | O | TLV | 6 |
| Override Wait Period | OWP | O | TLV | 3 |

It should be noted that in Table 2, one and only one of the conditional information elements (IE) shall be present. No repeated instances of the conditional IEs are permissible (e.g. one and only one Location Area shall be present).

As shown in Table 3 below, Override Waiting Period (OWP) information may be added to paging PAGING CS PDU content to signal to a wireless communication device 104 to that it may respond to this paging request regardless of the remaining wait period. Modifications to known approaches are bolded, as indicated in Table 3 below.

TABLE 3

| Information elements | Type/ Reference | Presence | Format | Length |
|---|---|---|---|---|
| PDU type | PDU type/11.3.26 | M | V | 1 |
| IMSI | IMSI/11.3.14 | M | TLV | 5-10 |
| DRX Parameters | DRX Parameters/ 11.3.11 | M | TLV | 4 |
| BVCI a) | BVCI/11.3.6 | C | TLV | 4 |
| Location Area (note 1) | Location Area/11.3.17 | C | TLV | 7 |
| Routing Area (note 1) | Routing Area/11.3.31 | C | TLV | 8 |
| BSS Area Indication (note 1) | BSS Area Indication/11.3.3 | C | TLV | 3 |
| TLLI | TLLI/11.3.35 | O | TLV | 6 |
| Channel needed (note 2) | Channel needed/11.3.10 | O | TLV | 3 |
| eMLPP-Priority (note 2) | eMLPP-Priority/ 11.3.12 | O | TLV | 3 |
| TMSI (note 2) | TMSI/11.3.36 | O | TLV | 6 |
| Global CN-Id (note 2) | Global CN-Id/11.3.69 | O | TLV | 7 |
| Override Wait Period | OWP | O | TLV | 3 |

It should be noted that in Table 3, one and only one of the conditional IEs shall be present. No repeated instances of the conditional IEs are permissible (e.g. one and only one Location Area shall be present). It should also be noted that the fields in Table 3 are provided by the mobile switching center (MSC) 1063 via the Gs-Interface.

As referenced in Table 2 and Table 3, the Override Waiting Period (OWP) corresponds to the information element shown below in Table 4.

TABLE 4

| | 8 | 7 | 6 | 5 | 4 | 3 | 2 | 1 |
|---|---|---|---|---|---|---|---|---|
| octet 1 | | | | IEI | | | | |
| octet 2, 2a | | | | Length Indicator | | | | |
| octet 3 | | | | Spare | | | | OWP |

In Table 4, Override Waiting Period (OWP) set to "0" may indicate that the wireless communication device 104 is not allowed to override the waiting period. Alternatively, Override Waiting Period (OWP) set to "1" may indicate that the wireless communication device 104 is allowed to override the waiting period.

Embodiments of the present invention described herein may require changes to the base station control (BSC) to wireless communication device 104 (e.g., mobile station (MS)) control interface. In some known configurations, the Override Waiting Period (OWP) flag may need to be communicated over a radio interface to the wireless communication device 104. According to the embodiments of the present invention described herein, an Override Waiting Period (OWP) flag may be added to the P1 Rest Octets, P2 Rest Octets, and P3 Rest Octets as shown below in Listing (1)- Listing (3). Please note, modification syntax from known approaches are indicated below in bold.

P1 Rest Octets

```
{ < P1 Rest Octets > ::=
  { L | H < NLN(PCH) : bit (2) > < NLN status(PCH) : bit >}
  { L | H < Priority1 ::= Priority >}
  { L | H < Priority2 ::= Priority >}
  { L | H < Group Call information >}
  < Packet Page Indication 1 : {L | H} >
  < Packet Page Indication 2 : {L | H} >
  {  null    | L       -- Receiver compatible with earlier release
             | H       -- Additions in Release 6 :
     { 0 | 1
        {     00     < CELL_GLOBAL_COUNT:bit(2) >
            | 01< CELL_GLOBAL_COUNT:bit(2) >
                  < VSTK_RAND : bit (36) >
            | 10< Reduced_GCR : bit (28) >
                  < VSTK_RAND : bit (36) >
            | 11< CELL_GLOBAL_COUNT:bit(2) >
                  < Reduced_GCR : bit (28) >
                  < VSTK_RAND : bit (36) >
        }
     }
     { 0 | 1    -- MBMS parameters included
        {   0       -- MBMS pre-notification
          I 1       -- MBMS notification
          <MBMS Notification 1 : <    MBMS Channel Parameters IE > >}
        {   0       -- MBMS pre-notification
          I 1       -- MBMS notification
          <MBMS Notification 2 : { 0 | 1 < MBMS Channel Parameters IE > } > }
     -- '0'indicates that the same MBMS Channel Parameters
as for MBMS Notification 1 apply
          { 0 | 1 <MBMS Information> }
     }
  }
  {  null    | L       -- Receiver compatible with earlier release
             | H       -- Additions in Release 7 :
     { 0 | 1 <AMR Config:bit(4)> }
  }
  {  null    | L       -- Receiver compatible with earlier release
             | H       -- Additions in Release 8
     < Priority Uplink Access : bit >
     { 0 | 1 < ETWS Primary Notification : < ETWS Primary Notification struct > > }
  }
  { null | L  -- Mobile Identity 1 not allowed to override waiting period.
         | H  -- Mobile Identity 1 may override waiting period.
  }
  { null | L  -- Mobile Identity 2 not allowed to override waiting period.
         | H  -- Mobile Identity 2 may override waiting period.
  }
  < spare padding >;
} //  -- truncation according to sub-clause 8.9 is allowed, bits "L" assumed
```

Listing (1)

P2 Rest Octets

```
{ <P2 Rest Octets> ::=
  { L | H <CN3: bit (2)>}
  { L | H <NLN(PCH) : bit (2)> <NLN status(PCH) : bit>}
  { L | H <Priority1 ::= Priority>}
  { L | H <Priority2 ::= Priority>}
  { L | H <Priority3 ::= Priority>}
  < Packet Page Indication 3 : {L | H} >
  { null  | L              -- Receiver compatible with earlier release
          | H              -- Additions in Release 6 :
     { 0 I 1 -- MBMS parameters included
        {   0    -- MBMS pre-notification
          I 1    -- MBMS notification
          <MBMS Notification 3 : < MBMS Channel
           Parameters IE > > }
        { 0 | 1 < MBMS Information > }
     }
  }
  { null | L  -- Mobile Identity 1 not allowed to override waiting
                 period.
         | H  -- Mobile Identity 1 may override waiting period.
  }
  { null | L  -- Mobile Identity 2 not allowed to override waiting
                 period.
         | H  -- Mobile Identity 2 may override waiting period.
  }
  { null | L  -- Mobile Identity 3 not allowed to override waiting
                 period.
         | H  -- Mobile Identity 3 may override waiting period.
  }
<spare padding>;
} //  -- truncation according to sub-clause 8.9 is allowed, bits 'L' assumed
<Priority> ::= <bit(3)>;
<MBMS Information> ::=
-- Pre-notifications
< MBMS Sessions List : < MBMS Sessions List IE > >
-- Notifications: listed per MBMS Channel Parameters
-- 1) Notifications with same MBMS Channel Parameters
as in Notification 3
{   0     -- None
  | 1     -- Same MBMS Channel Parameters as Notification 3
     < MBMS Sessions List : < MBMS Sessions List IE > > }
-- 2) Notifications with specific MBMS Channels Parameters
```

P2 Rest Octets

```
{ 1    < MBMS Channel Parameters : < MBMS Channel
        Parameters IE > >
        < MBMS Sessions List : < MBMS Sessions List IE > > } ** 0 ;
```

Listing (2)

P3 Rest Octets

```
< P3 Rest Octets > ::=
    {L | H < CN3 : bit (2) > < CN4 : bit (2) >}
    {L | H < NLN(PCH) : bit (2) > < NLN status(PCH) : bit >}
    {L | H < Priority1 ::= Priority >}
    {L | H < Priority2 ::= Priority >}
    {L | H < Priority3 ::= Priority >}
    {L | H < Priority4 ::= Priority >}
    {   null | L  -- Mobile Identity 1 not allowed to override waiting
                     period.
           |H     -- Mobile Identity 1 may override waiting period.
    }
    {   null | L  -- Mobile Identity 2 not allowed to override waiting
                     period.
           |H     -- Mobile Identity 2 may override waiting period.
    }
    {   null | L  -- Mobile Identity 3 not allowed to override waiting
                     period.
           |H     -- Mobile Identity 3 may override waiting period.
    }
    {   null | L  -- Mobile Identity 4 not allowed to override waiting
                     period.
           |H     -- Mobile Identity 4 may override waiting period.
    }
    < spare padding >;
} // -- truncation according to sub-clause 8.9 is allowed, bits 'L' assumed
< Priority > ::= < bit(3) >;
```

Listing (3)

An alternative format for coding this information within P1, P2, and P3 Rest octets is as shown below in Listing (4)-Listing (6). Please note, for simplicity, the legacy content of P1, P2, and P3 rest octets is omitted.

P1 Rest Octets

```
< P1 Rest Octets > ::=
...
{ null | L   -- None of the addressed devices allowed to override waiting
period.
     | H {  < Override Wait Period 1: bit >
            < Override Wait Period 2: bit >
        -- 0 Addressed device not allowed to override wait period.
        -- 1   Addressed device is allowed to override wait period.}
       }
}
...
```

Listing (4)

Listing (4) shows Override Wait Period 1 and Override Wait Period 2. These fields, if present, define if addressed wireless communication devices 104 are allowed to override a waiting period. Override Wait Period i refers to Mobile Identity i. For example, Override Wait Period 2 refers to Mobile Identity 2.

P2 Rest Octets

```
< P2 Rest Octets > ::=
...
{ null | L   -- None of the addressed devices allowed to override
waiting period.
     |H {  < Override Wait Period 1 : bit >
            < Override Wait Period 2 : bit >
            < Override Wait Period 3 : bit >
        -- 0 Addressed device not allowed to override wait period.
        -- 1 Addressed device is allowed to override wait period.}
       }
}
...
```

Listing (5)

Listing (5) shows Override Wait Period 1, Override Wait Period 2, and Override Wait Period 3. These fields, if present, define if addressed wireless communication devices 104 are allowed to override a waiting period. Override Wait Period i refers to Mobile Identity i. For example, Override Wait Period 1 refers to Mobile Identity 1.

P3 Rest Octets

```
< P3 Rest Octets > ::=
...
{ null | L   -- None of the addressed devices allowed to override
waiting period.
     |H {  < Override Wait Period 1 : bit >
            < Override Wait Period 2 : bit >
            < Override Wait Period 3 : bit >
            < Override Wait Period 4 : bit >
        -- 0 Addressed device not allowed to override wait period.
        -- 1 Addressed device is allowed to override wait period.}
       }
}
...
```

Listing (6)

Listing (6) shows Override Wait Period 1, Override Wait Period 2, Override Wait Period 3, and Override Wait Period 4. These fields, if present, define if addressed wireless communication devices 104 are allowed to override awaiting period. Override Wait Period i refers to Mobile Identity i. For example, Override Wait Period 3 refers to Mobile Identity 3.

In Listing (4)-Listing (6) above, the coding may be more efficient in that if no override waiting period needs to be signaled to any of the addressed devices, then only 1 bit is consumed.

Description of Operating Components of Some Embodiments

Figure 16:
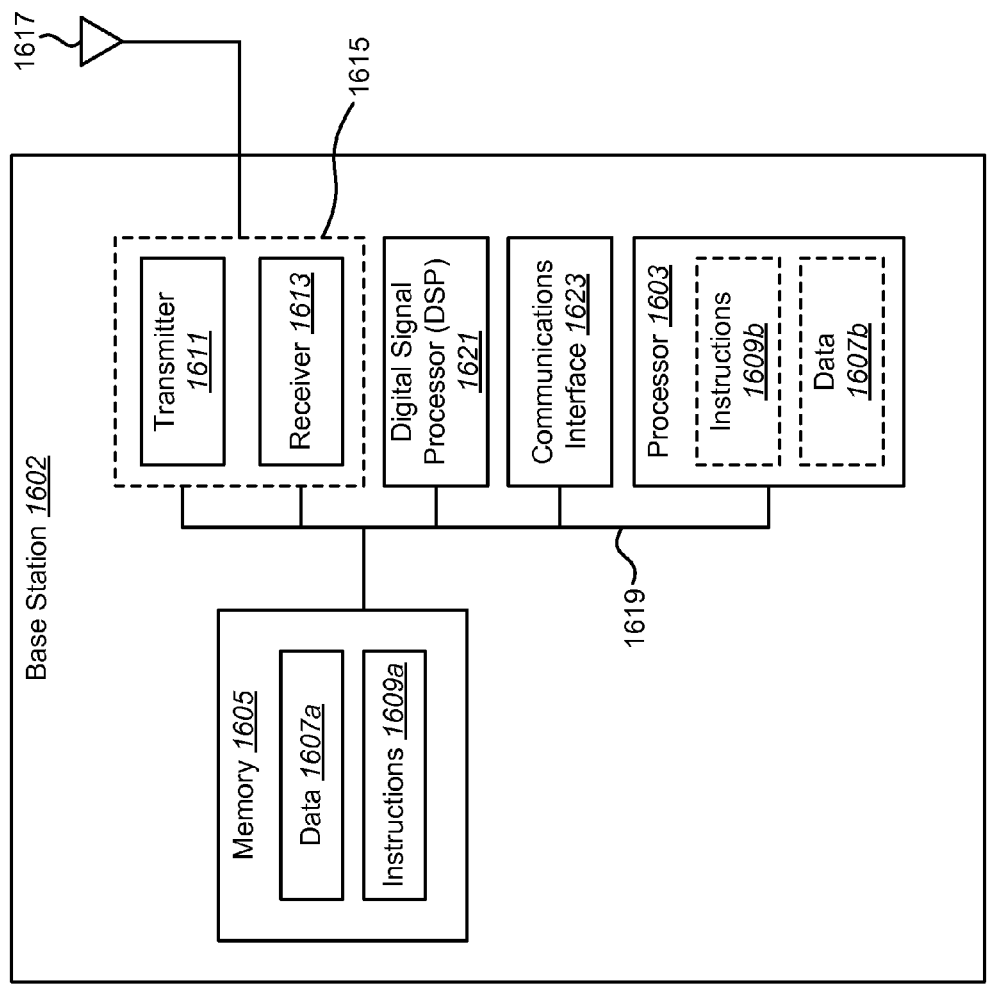
FIG. 16 illustrates certain components that may be included within a base station according to some embodiments of the present invention.

FIG. 16 illustrates certain components that may be included within a base station 1602 according to some embodiments of the present invention. A base station 1602 may also be referred to as, and may include some or all of the functionality of, an access point, a broadcast transmitter, a NodeB, an evolved NodeB, etc. The base station 1602 includes a processor 1603. The processor 1603 may be a general purpose single- or multi-chip microprocessor (e.g., an ARM), a special purpose microprocessor (e.g., a digital signal processor (DSP)), a microcontroller, a programmable gate array, etc. The processor 1603 may be referred to as a central processing unit (CPU). Although just a single processor 1603 is shown in the base station 1602 of FIG. 16, in an alternative configuration, a combination of processors (e.g., an ARM and DSP) could be used.

The base station 1602 also includes memory 1605. The memory 1605 may be any electronic component capable of storing electronic information. The memory 1605 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1607a and instructions 1609a may be stored in the memory 1605. The instructions 1609a may be executable by the processor 1603 to implement the methods disclosed herein. Executing the instructions 1609a may involve the use of the data 1607a that is stored in the memory 1605. When the processor 1603 executes the instructions 1609a, various portions of the instructions 1609b may be loaded onto the processor 1603, and various pieces of data 1607b may be loaded onto the processor 1603.

The base station 1602 may also include a transmitter 1611 and a receiver 1613 to allow transmission and reception of signals to and from the base station 1602. The transmitter 1611 and receiver 1613 may be collectively referred to as a transceiver 1615. An antenna 1617 may be electrically coupled to the transceiver 1615. The base station 1602 may also include (not shown) multiple transmitters, multiple receivers, multiple transceivers and/or additional antennas.

The base station 1602 may include a digital signal processor (DSP) 1621. The base station 1602 may also include a communications interface 1623. The communications interface 1623 may allow a user to interact with the base station 1602.

The various components of the base station 1602 may be coupled together by one or more buses, which may include a power bus, a control signal bus, a status signal bus, a data bus, etc. For the sake of clarity, the various buses are illustrated in FIG. 16 as a bus system 1619.

Figure 17:
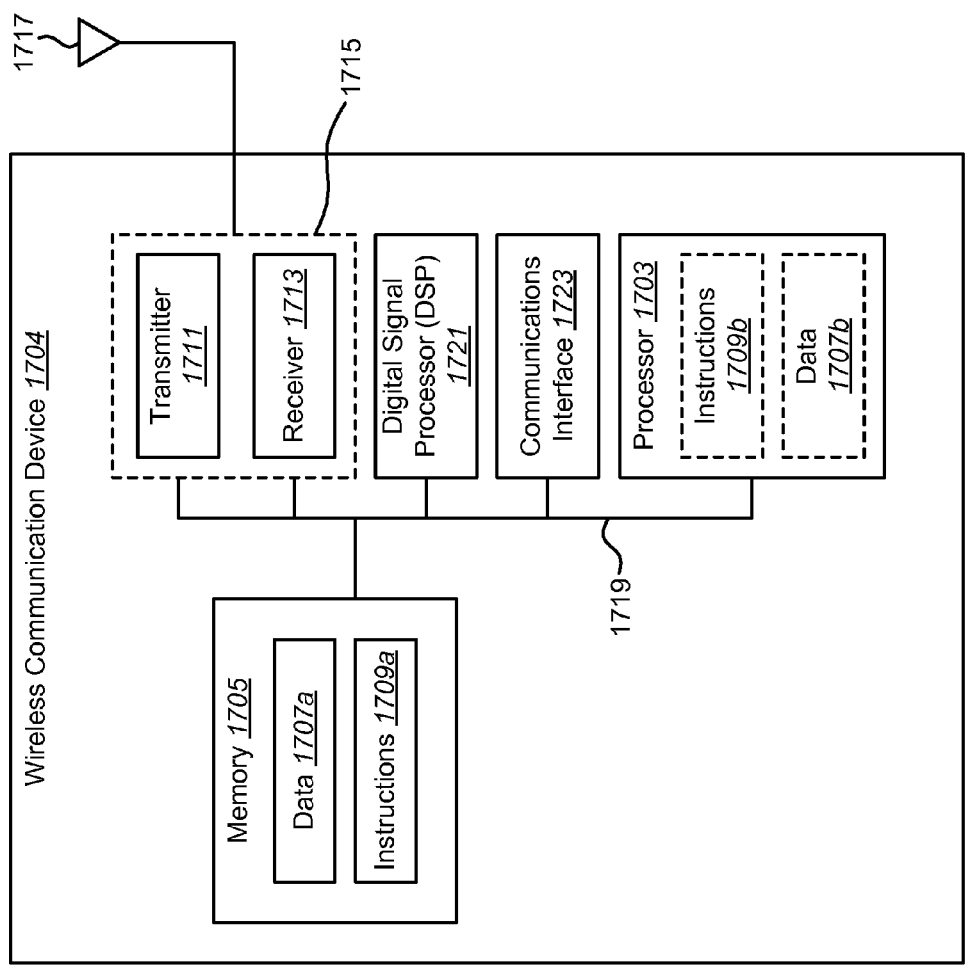
FIG. 17 illustrates certain components that may be included within a wireless communication device according to some embodiments of the present invention.

FIG. 17 illustrates certain components that may be included within a wireless communication device 1704 according to some embodiments of the present invention. The wireless communication device 1704 may be an access terminal, a mobile station, a user equipment (UE), etc. The wireless communication device 1704 includes a processor 1703. The processor 1703 may be a general purpose single- or multi-chip microprocessor (e.g., an ARM), a special purpose microprocessor (e.g., a digital signal processor (DSP)), a microcontroller, a programmable gate array, etc. The processor 1703 may be referred to as a central processing unit (CPU). Although just a single processor 1703 is shown in the wireless communication device 1704 of FIG. 17, in an alternative configuration, a combination of processors (e.g., an ARM and DSP) could be used.

The wireless communication device 1704 also includes memory 1705. The memory 1705 may be any electronic component capable of storing electronic information. The memory 1705 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1707a and instructions 1709a may be stored in the memory 1705. The instructions 1709a may be executable by the processor 1703 to implement the methods disclosed herein. Executing the instructions 1709a may involve the use of the data 1707a that is stored in the memory 1705. When the processor 1703 executes the instructions 1709, various portions of the instructions 1709b may be loaded onto the processor 1703, and various pieces of data 1707b may be loaded onto the processor 1703.

The wireless communication device 1704 may also include a transmitter 1711 and a receiver 1713 to allow transmission and reception of signals to and from the wireless communication device 1704 via an antenna 1717. The transmitter 1711 and receiver 1713 may be collectively referred to as a transceiver 1715. The wireless communication device 1704 may also include (not shown) multiple transmitters, multiple antennas, multiple receivers, and/or multiple transceivers.

The wireless communication device 1704 may include a digital signal processor (DSP) 1721. The wireless communication device 1704 may also include a communications interface 1723. The communications interface 1723 may allow a user to interact with the wireless communication device 1704.

The various components of the wireless communication device 1704 may be coupled together by one or more buses, which may include a power bus, a control signal bus, a status signal bus, a data bus, etc. For the sake of clarity, the various buses are illustrated in FIG. 17 as a bus system 1719.

The techniques described herein may be used for various communication systems. These systems can include communication systems that are based on code division or orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

While some embodiments of the present invention have been discussed with a GSM context, other embodiments of the present invention can be utilized with additional network technology environments. As some examples, embodiments can be incorporated into mesh-type networks, ad-hoc type networks, or peer-to-peer type networks. In addition, embodiments of the present invention can be incorporated into other varying networks capable of supporting MTC or MTM type devices. Embodiments of the present invention may also be utilized when communication between MTC or MTM type devices may be desired to enable intermediate nodes to exist between communicating devices.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM, or other optical disk storage, magnetic disk storage, or other magnetic storage devices or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 12-15, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

We claim:

1. A method for establishing a communication channel with a wireless communication device that is a machine type communication (MTC) device, the method comprising:
   receiving, at a base station, a first channel request from the wireless communication device;
   transmitting, in response to the first channel request, an assignment reject message to the wireless communication device that comprises a wait state time period and is configured to place the wireless communication device into a wait state for the wait state time period;
   generating a message that comprises a wait state override indicator in response to receiving an indication that the wait state of the wireless communication device needs overriding to allow communication with the wireless communication device, wherein the message is generated in response to reception of an urgent information message that comprises the wait state override indicator, the urgent information message initiated at a server outside a radio access network (RAN);
   transmitting the message to the wireless communication device; and
   establishing a communication channel with the wireless communication device based on the wait state override indicator.

2. The method of claim 1, further comprising receiving a second channel request from the wireless communication device, wherein the second channel request was made in response to the message.

3. The method of claim 2, wherein the second channel request is received via an access channel.

4. The method of claim 1, wherein the wireless communication device is in the wait state when the message is transmitted to the wireless communication device, and wherein channel requests cannot be transmitted by the wireless communication device unless the wait state is overridden.

5. The method of claim 4, wherein the message is transmitted prior to expiration of the wait state of the wireless communication device.

6. The method of claim 4, wherein the message is transmitted after expiration of the wait state of the wireless communication device.

7. The method of claim 1, wherein the message comprises a paging message.

8. The method of claim 1, wherein the wireless communication device can operate autonomously to initiate establishment of a communication channel.

9. The method of claim 1, wherein the method is performed by the base station, and wherein the wireless communication device is a machine type communication device.

10. The method of claim 1, wherein the wait state override indicator in the message is transmitted to more than one wireless communication device.

11. An apparatus for establishing a communication channel with a wireless communication device that is a machine type communication (MTC) device, comprising:
a processor;
memory in electronic communication with the processor; and
instructions stored in the memory, the instructions being executable by the processor to:
receive, at a base station, a first channel request from the wireless communication device;
transmit, in response to the first channel request, an assignment reject message to the wireless communication device that comprises a wait state time period and is configured to place the wireless communication device into a wait state for the wait state time period
generate a message that comprises the wait state override indicator in response to receiving an indication that a wait state of the wireless communication device needs overriding to allow communication with the wireless communication device, wherein the message is generated in response to reception of an urgent information message that comprises the wait state override indicator, the urgent information message initiated at a server outside a radio access network (RAN);
transmit the message to the wireless communication device; and
establish a communication channel with the wireless communication device based on the wait state override indicator.

12. The apparatus of claim 11, further comprising instructions executable to receive a second channel request from the wireless communication device, wherein the second channel request was made in response to the message.

13. The apparatus of claim 12, wherein the second channel request is received via an access channel.

14. The apparatus of claim 11, wherein the wireless communication device is in the wait state when the message is transmitted to the wireless communication device, and wherein channel requests cannot be transmitted unless the wait state is overridden.

15. The apparatus of claim 14, wherein the message is transmitted prior to expiration of the wait state of the wireless communication device.

16. The apparatus of claim 14, wherein the message is transmitted after expiration of the wait state of the wireless communication device.

17. The apparatus of claim 11, wherein the message comprises a paging message.

18. The apparatus of claim 11, wherein the wireless communication device can operate autonomously to initiate establishment of a communication channel.

19. The apparatus of claim 11, wherein the apparatus is a base station, and wherein the wireless communication device is a machine type communication device.

20. The apparatus of claim 11, wherein the wait state override indicator in the message is transmitted to more than one wireless communication device.

21. A method for establishing a communication channel by a wireless communication device that is a machine type communication (MTC) device, the method comprising:
transmitting a first channel request to a wireless communication system;
receiving an assignment reject message, that comprises a wait state time period, from the wireless communication system in response to the first channel request;
entering a wait state for the wait state time period based on the assignment reject message;
receiving a message from the wireless communication system, wherein the message is generated in response to an urgent information message that comprises the wait state override indicator, the urgent information message initiated at a server outside a radio access network (RAN);
determining from the message that the wait state is to be overridden; and
attempting to establish a communication channel with the wireless communication system based on the message.

22. The method of claim 21, wherein attempting to establish a communication channel comprises transmitting a second channel request on an access channel in response to the message.

23. The method of claim 21, further comprising waiting in the wait state, wherein channel requests cannot be transmitted unless the wait state is overridden.

24. The method of claim 21, wherein the message comprises a paging message, wherein the message comprises a wait state override flag, and wherein determining that a wait state is to be overridden comprises determining that the value of the wait state override flag indicates that the wait state is to be overridden.

25. The method of claim 21, further comprising returning to the wait state after completion of information exchange related to wait state override.

26. The method of claim 21, wherein the wireless communication device can operate autonomously to initiate establishment of a communication channel.

27. The method of claim 21, wherein the wireless communication device is a machine type communication device, and wherein the wireless communication system is a radio access network.

28. The method of claim 27, wherein the radio access network comprises one of a group of a gateway, a base station subsystem, a system control, a mobile switching station, and a serving general packet radio service support node.

29. An apparatus for establishing a communication channel by a wireless communication device that is a machine type communication (MTC) device, comprising:
a processor;
memory in electronic communication with the processor; and instructions stored in the memory, the instructions being executable by the processor to:
transmit a first channel request to a wireless communication system;
receive an assignment reject message, that comprises a wait state time period, from the wireless communication system in response to the first channel request;
enter a wait state for the wait state time period based on the assignment reject message;
receive a message from the wireless communication system, wherein the message is generated in response to an urgent information message that comprises the wait state override indicator, the urgent information message initiated at a server outside a radio access network (RAN);
determine from the message that the wait state is to be overridden; and
attempt to establish a communication channel with the wireless communication system based on the message.

30. The apparatus of claim 29, wherein the instructions executable to attempt to establish a communication channel comprise instructions executable to transmit a second channel request on an access channel in response to the message.

31. The apparatus of claim 29, wherein the instructions are further executable to cause the wireless communication device to wait in the wait state, and wherein channel requests cannot be transmitted unless the wait state is overridden.

32. The apparatus of claim 29, wherein the message comprises a paging message, wherein the message comprises a wait state override flag, and wherein the instructions executable to determine that the wait state is to be overridden comprise instructions executable to determine that the value of the wait state override flag indicates that the wait state is to be overridden.

33. The apparatus of claim 29, wherein the instructions are further executable to return to the wait state after completion of information exchange related to wait state override.

34. The apparatus of claim 29, wherein the apparatus can operate autonomously to initiate establishment of a dedicated communication channel.

35. The apparatus of claim 29, wherein the apparatus is a machine type communication device, and wherein the wireless communication system is a radio access network.

36. The apparatus of claim 35, wherein the radio access network comprises one of a group of a gateway, a base station subsystem, a system control, a mobile switching station, and a serving general packet radio service support node.

37. A non-transitory computer-readable medium having instructions thereon for establishing a communication channel with a wireless communication device that is a machine type communication (MTC) device, the instructions comprising:
code for causing a base station to receive a first channel request from the wireless communication device;
code for causing the base station to transmit, in response to the first channel request, an assignment reject message to the wireless communication device that comprises a wait state time period and is configured to place the wireless communication device into a wait state for the wait state time period;
code for causing the base station to generate a message that comprises a wait state override indicator in response to receiving an indication that the wait state of the wireless communication device needs overriding to allow communication with the wireless communication device, wherein the message is generated in response to reception of an urgent information message that comprises the wait state override indicator, the urgent information message initiated at a server outside a radio access network (RAN);
code for causing the base station to transmit the message to the wireless communication device; and
code for causing the base station to establish a communication channel with the wireless communication device based on the wait state override indicator.

38. The computer-readable medium of claim 37, wherein the wireless communication device is in the wait state when the message is transmitted to the wireless communication device, and wherein channel requests cannot be transmitted unless the wait state is overridden.

39. The computer-readable medium of claim 38, wherein the message is transmitted prior to the expiration of the wait state of the wireless communication device.

40. The computer-readable medium of claim 37, wherein the message comprises a paging message.

41. A non-transitory computer-readable medium having instructions thereon for establishing a communication channel by a wireless communication device that is a machine type communication (MTC) device, the instructions comprising:
code for causing the wireless communication device to transmit a first channel request to a wireless communication system;
code for causing the wireless communication device to receive an assignment reject message, that comprises a wait state time period, from the wireless communication system in response to the first channel request;
code for causing the wireless communication device to enter a wait state for the wait state time period based on the assignment reject message;
code for causing the wireless communication device to receive a message from the wireless communication system, wherein the message is generated in response to an urgent information message that comprises the wait state override indicator, the urgent information message initiated at a server outside a radio access network (RAN);
code for causing the wireless communication device to determine from the message that the wait state is to be overridden; and
code for causing the wireless communication device to attempt to establish a communication channel with the wireless communication system based on the message.

42. The computer-readable medium of claim 41, wherein the code for causing the wireless communication device to attempt to establish a communication channel comprises code for causing the wireless communication device to transmit a second channel request on an access channel in response to the message.

43. The computer-readable medium of claim 41, further comprising code for causing the wireless communication device to wait in the wait state, wherein channel requests cannot be transmitted unless the wait state is overridden.

44. The computer-readable medium of claim 41, wherein the message comprises a paging message, wherein the message comprises a wait state override flag, and wherein the code for causing the wireless communication device to determine that the wait state is to be overridden comprises code for causing the wireless communication device to determine that the value of the wait state override flag indicates that the wait state is to be overridden.

45. A wireless communication device that is a machine type communication (MTC) device comprising:

a processor;

a memory coupled to the processor, wherein the memory includes instructions executable by the processor to:

transmit a first channel request to a base station;

receive an assignment reject message, that comprises a wait state time period, from the base station in response to the first channel request;

enter the wireless communication device in a wait state for the wait time period based on the assignment reject message;

monitor for an override flag, wherein the override flag is generated in response to an urgent information message, the urgent information message initiated at a server outside a radio access network (RAN);

enter the wireless communication device from the wait state to a communication state by attempting to communicate with the base station based on receiving the override flag;

enable the wireless communication device to enter the communicate state with the base station; and upon completion of the communicate state, re-enter the wireless communication device in a wait state.

46. The wireless communication device of claim 45, wherein while the wireless communication device is in the wait state, the wireless communication device cannot transmit messages relating to establishment of a communication channel unless the wait state is overridden.

47. The wireless communication device of claim 46, wherein the override flag is transmitted prior to the expiration of the wait state of the wireless communication device.

48. The wireless communication device of claim 46, wherein the messages comprises at least one paging message.

\* \* \* \* \*